United States Patent
Bousquet et al.

(10) Patent No.: US 11,696,038 B2
(45) Date of Patent: Jul. 4, 2023

(54) MULTIPLE CAMERA COLOR BALANCING

(71) Applicant: Plantronics, Inc., Santa Cruz, CA (US)

(72) Inventors: James Miles Bousquet, Austin, TX (US); Joseph Daniel Friel, Austin, TX (US); George D. Wilson, Jr., Austin, TX (US)

(73) Assignee: Plantronics Inc., Santa Cruz, CA (US)

(*) Notice: Subject to any disclaimer, the term of this patent is extended or adjusted under 35 U.S.C. 154(b) by 0 days.

(21) Appl. No.: 17/659,895

(22) Filed: Apr. 20, 2022

(65) Prior Publication Data

US 2022/0294969 A1    Sep. 15, 2022

Related U.S. Application Data

(60) Provisional application No. 63/161,133, filed on Mar. 15, 2021.

(51) Int. Cl.
*H04N 7/15* (2006.01)
*H04N 23/45* (2023.01)
(Continued)

(52) U.S. Cl.
CPC ........... *H04N 23/741* (2023.01); *G06V 10/24* (2022.01); *G06V 10/25* (2022.01); *G06V 20/50* (2022.01);
(Continued)

(58) Field of Classification Search
CPC ...... H04N 23/741; H04N 7/152; H04N 23/45; H04N 23/80; H04N 7/147; G06V 10/24;
(Continued)

(56) References Cited

U.S. PATENT DOCUMENTS 8,428,350 B2 * 4/2013 Panahpour Tehrani . H04N 9/68
382/167
10,643,318 B2 * 5/2020 Yazawa ..................... G06T 7/90
(Continued)

OTHER PUBLICATIONS

Kazutake Uehira and Kazumi Komiya, "Seamless Image-Connection Technique for a Multiple-Sensor Camera", 2334b IEICE Transactions on Communications E770B Feb. 1994, No. 2, Tokyo, JP.

(Continued)

*Primary Examiner* — Hung H Lam
(74) *Attorney, Agent, or Firm* — Quarles & Brady LLP

(57) ABSTRACT

Color and exposure matching for systems, such as a videoconferencing endpoint, that have overlapping camera fields of view. The geometric relationships between the overlapping cameras are used to determine correction processing. For each camera, histograms are developed for the overlapping cameras. A dynamic threshold is determined for each histogram. Using the dynamic threshold, peak detection is performed on each histogram. Using the geometric relationships, expected histogram relationships are determined. The actual histogram relationships are compared to the expected relationships, with further processing based on the correctness of the comparison. In some of the cases of further processing, peaks of the histograms are compared to find matching and non-matching peaks. Various ratios of pixels in the various peaks are used to determine needed changes to respective cameras. Incremental changes to camera outputs are provided and accumulated so that overall changes can be provided to adjust the output of the respective cameras.

20 Claims, 15 Drawing Sheets

(51) Int. Cl.
*H04N 23/741* (2023.01)
*G06V 10/25* (2022.01)
*G06V 10/24* (2022.01)
*G06V 20/50* (2022.01)
*H04N 23/80* (2023.01)

(52) U.S. Cl.
CPC ............ *H04N 7/152* (2013.01); *H04N 23/45* (2023.01); *H04N 23/80* (2023.01)

(58) Field of Classification Search
CPC ........ G06V 10/25; G06V 20/50; G06V 10/82; G06V 20/52; G06V 40/103; G06V 40/161
See application file for complete search history.

(56) References Cited

U.S. PATENT DOCUMENTS

| | | | | |
|---|---|---|---|---|
| 2009/0190828 | A1* | 7/2009 | James | H04N 1/6008 382/168 |
| 2010/0045800 | A1* | 2/2010 | Chebil | G06T 7/20 348/169 |
| 2011/0102578 | A1* | 5/2011 | Kaminaga | H04N 23/741 348/135 |
| 2021/0209799 | A1* | 7/2021 | Sugawara | H04N 13/246 |

OTHER PUBLICATIONS

Selected trade secret design details of RoundTable panoramic camera, submitted under MPEP 724.02.

* cited by examiner

MULTIPLE CAMERA COLOR BALANCING

TECHNICAL FIELD

This disclosure relates generally to determining and adjusting video camera image colors.

BACKGROUND

The use of multiple cameras having overlapping fields of view is becoming more common. High end cellphones include three or four overlapping cameras. The cameras can include a high pixel count camera, an optical zoom camera, a telephoto camera and a wide-angle camera. The fields of view of the cameras are at least partially overlapping. The Polycom® CX5500™ Unified Conference Station provides a 360° panoramic image by using five overlapping cameras arranged about an optical center.

One problem with overlapping cameras is that the color outputs of each camera are different, even if the underlying imagers are the same. This requires performing some form of color balancing of the various outputs. Some cameras addressed the problem by performing detailed manual balancing of each camera, which was time consuming and changed over time as the imagers aged and drifted, requiring recalibration. In some cellphones, one camera is defined as the master camera and all other cameras are adjusted to the master camera. However, this can result in the other camera outputs becoming compromised if the master camera drifts beyond certain limits.

Another approach is described in "Seamless Image-Connection Technique for a Multiple-Sensor Camera," Kazutake Uehira and Kazumi Komiya, 2334b IEICE Transactions on Communications E770B (1994) February, No. 2, Tokyo, JP, where the pixels in the overlap areas were developed by using a weighted mean of the pixels from each imager. The Polycom CX5500 developed histograms for the overlap region of two overlapped cameras to develop a mapping function and then ramped the function values from the center of each camera (0%) to the edge (100%).

BRIEF DESCRIPTION OF THE DRAWINGS

For illustration, there are shown in the drawings certain examples described in the present disclosure. In the drawings, like numerals indicate like elements throughout. The full scope of the inventions disclosed herein are not limited to the precise arrangements, dimensions, and instruments shown. In the drawings.

DETAILED DESCRIPTION

Examples according to this description provide color and exposure matching for systems, such as a videoconferencing endpoint, that have overlapping camera fields of view. The geometric relationships between the overlapping cameras are used to determine correction processing. For each camera, histograms are developed for the overlapping cameras. A dynamic threshold is determined for each histogram. Using the dynamic threshold, peak detection is performed on each histogram. Using the geometric relationships, expected histogram relationships are determined. The actual histogram relationships are compared to the expected relationships, with further processing based on the correctness of the comparison. In some of the cases of further processing, peaks of the histograms are compared to find matching and non-matching peaks. Various ratios of pixels in the various peaks are used to determine needed changes to respective cameras. Incremental changes to camera outputs are provided and accumulated so that overall changes can be provided to adjust the output of the respective cameras. Eventually the differences between cameras are reduced to amounts that do not need further correction. Providing this initial color matching of overlapping cameras simplifies later color and white balance blending performed on each frame.

Figure 1B:
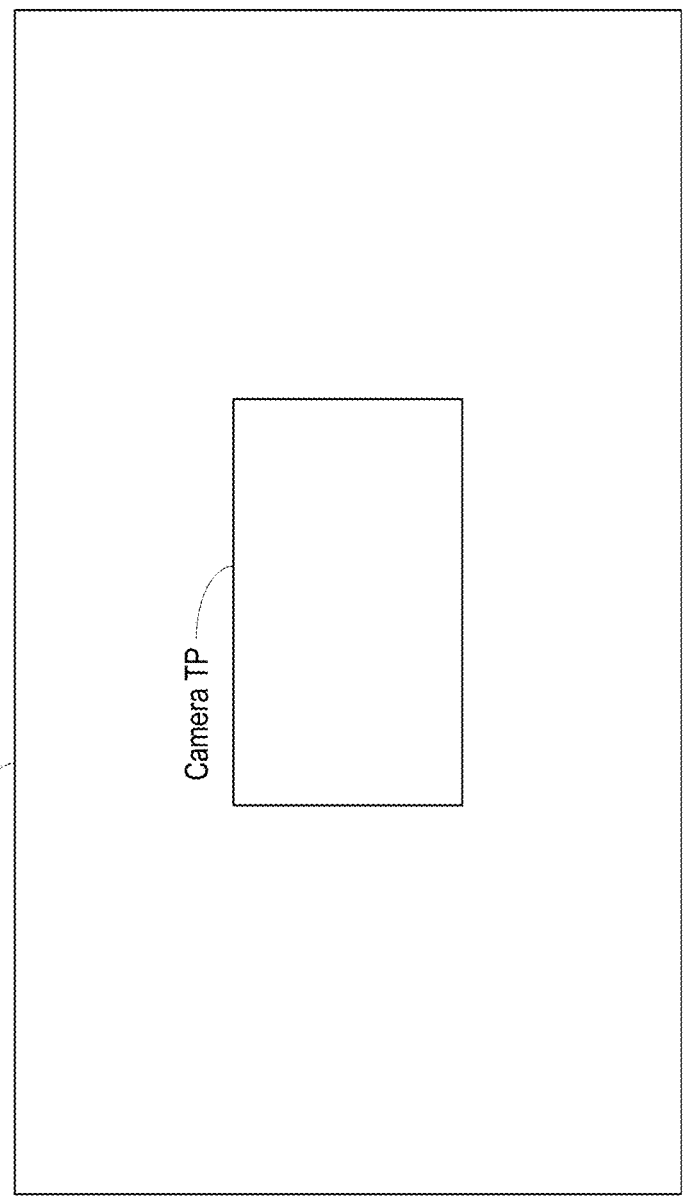
FIG. 1B is an illustration of the image areas of the wide-angle camera and telephoto camera of FIG. 1A.
Figure 1A:
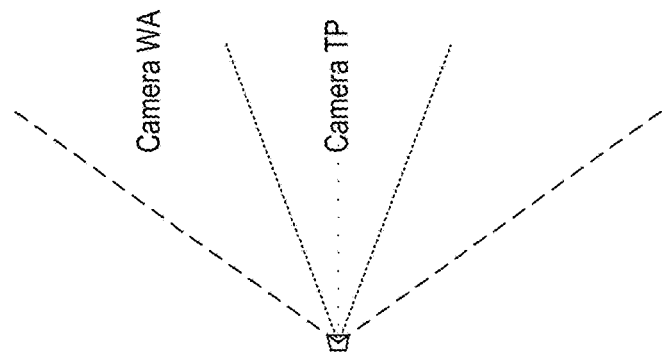
FIG. 1A is an illustration of a fields of view of a wide-angle camera and a telephoto camera that have similar optical centers according to an example of the present disclosure.

Referring now to FIG. 1A, the fields of view of a telephoto camera TP and a wide-angle camera WA are shown. The cameras TP and WA are presumed to have approximately similar optical centers. FIG. 1B illustrates the image areas of the cameras TP and WA. As can be seen, the image area of camera TP is entirely within the image area of camera WA.

Figure 2A:
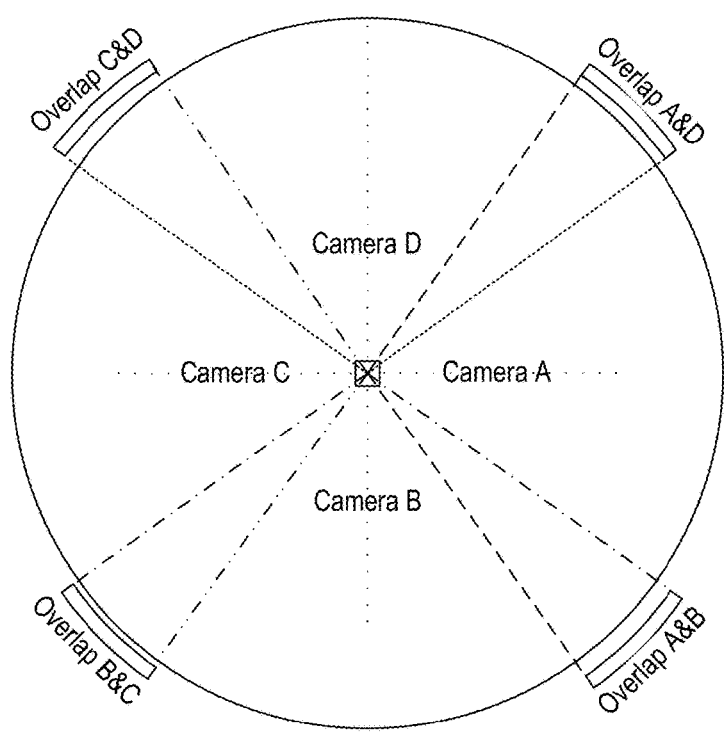
FIG. 2A is an illustration of a fields of view of a panoramic camera formed used four 90° field of view individual cameras, with the overlap areas shown, according to an example of the present disclosure.
Figure 2B:
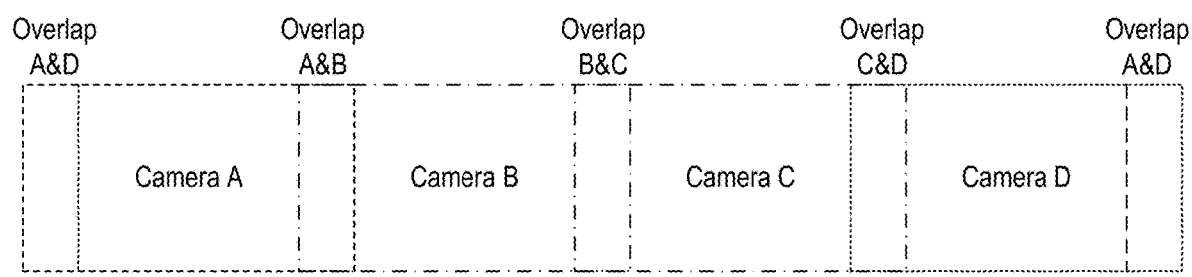
FIG. 2B is an illustration of a strip view of the images of the individual cameras in the panoramic camera of FIG. 2A, including the overlap areas.

FIG. 2A illustrates the overlapping fields of view of four cameras A, B, C and D that are used to develop a 360° panoramic image. The cameras A-D have approximately the same optical center, which requires the use of a pyramid or other reflecting configuration. Each camera A-D is illustrated as having approximately a 108° field of view, as opposed to the 90° theoretically needed. This results in an overlap of 9° with each adjacent camera A-D. FIG. 2B illustrates the image areas of the cameras A-D, with the overlapping areas shown. The camera A&D overlap is shown twice for visualization purposes.

Figure 3A:
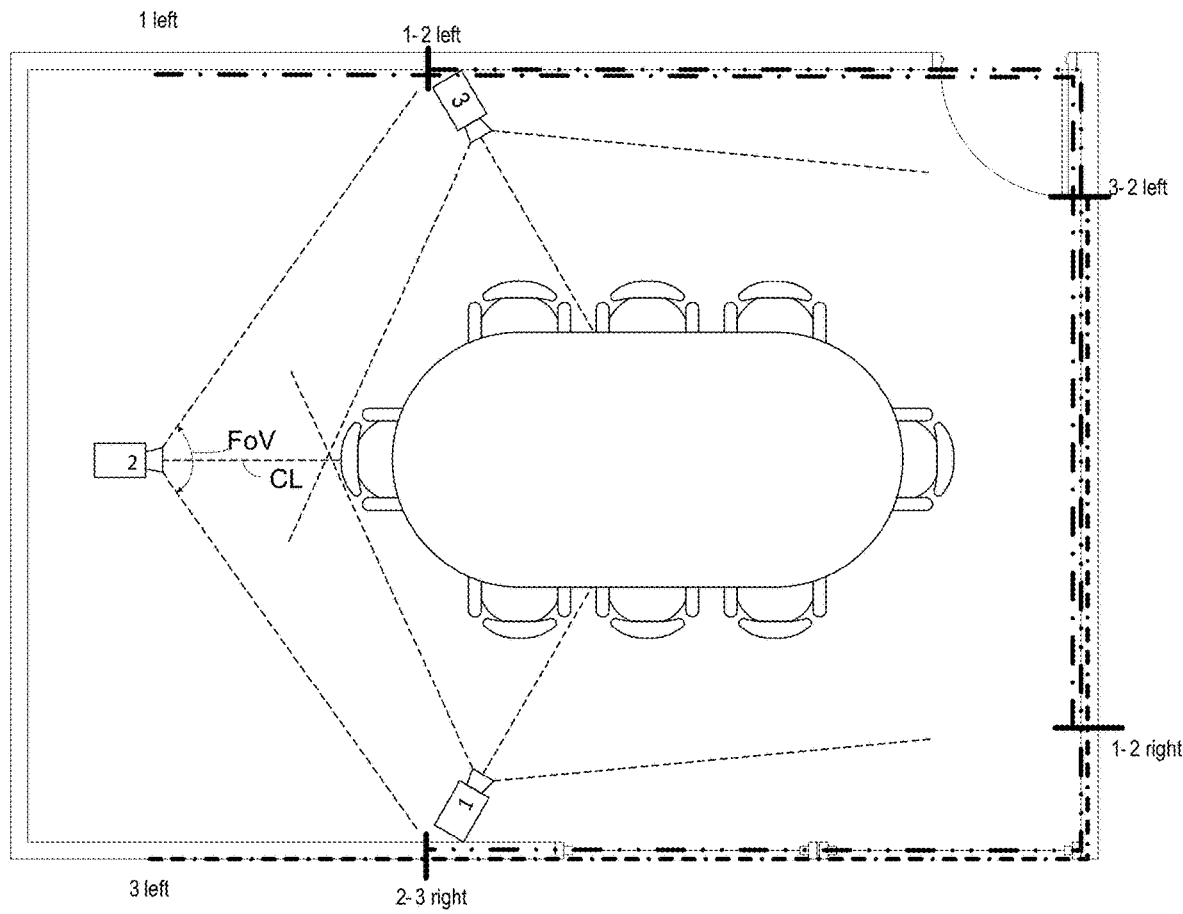
FIG. 3A is an illustration of a conference room with three cameras, with the overlap areas shown, according to an example of the present disclosure.
Figure 3B:
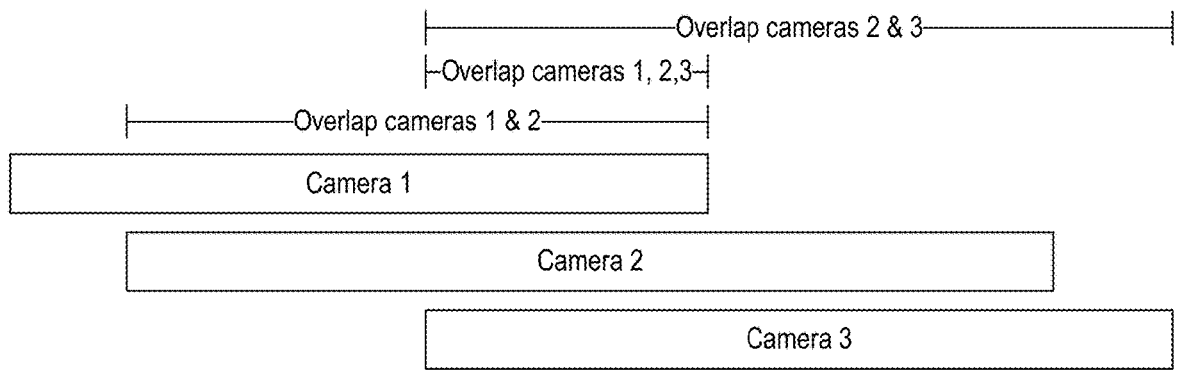
FIG. 3B is an illustration of the fields of view of the three cameras of FIG. 3A, showing overlap areas.

FIG. 3A illustrates the overlapping fields of view of three cameras 1, 2 and 3, when the cameras are arranged in a conference room at three different locations. The dashed lines indicate the fields of view of each camera 1-3 and the overlaps. FIG. 3B is an alternate view of the fields of view of the cameras 1-3. The individual fields of view are separated vertically to ease understanding, it being understood that the fields of view are superimposed in actual practice. FIG. 3B illustrates the various overlaps of the camera 1-3 fields of view that are useful for color balancing.

These are three exemplary configurations having overlapping camera fields of view and image area. It is understood that there are many other configurations of overlapping camera fields of view and image area but these three are used for explanatory purposes.

Figure 4B:
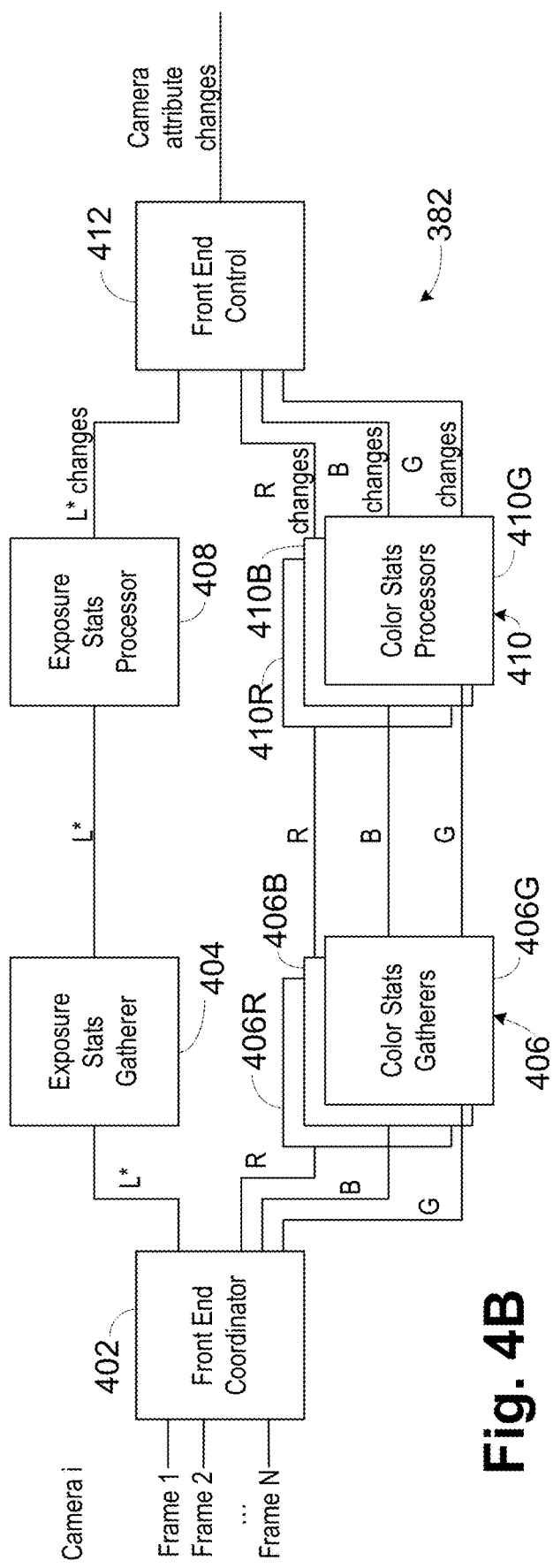
FIG. 4B is a block diagram of a camera color and exposure matching block of FIG. 4A.
Figure 4A:
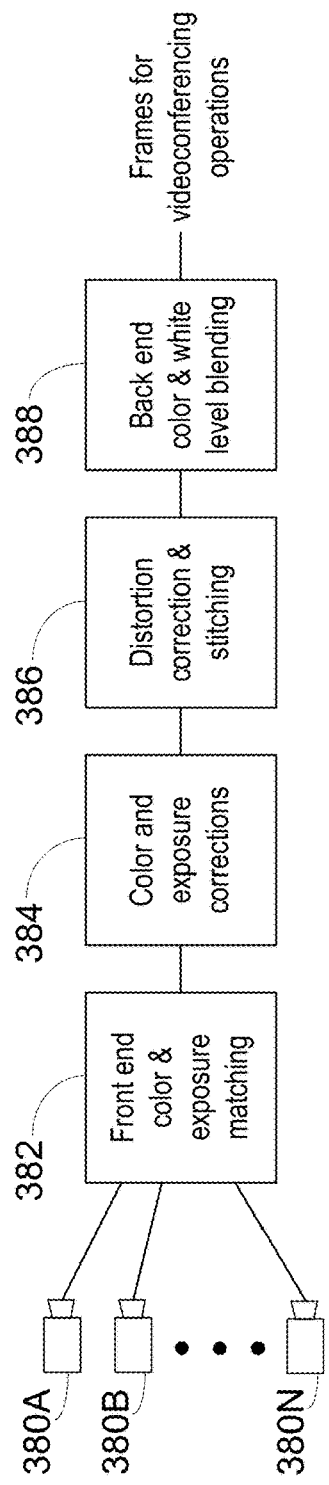
FIG. 4A is a block diagram of raw frame processing according to an example of the present invention.

FIG. 4A is a block diagram of raw image processing for an example according to the present invention. Cameras 380A, 380B to 380N provide frames to a front-end color and exposure matching block 382. The camera frames are corrected in correction block 384 as directed by the front-end color and exposure matching block 382. The color and exposure matched frames have distortion correction applied and any necessary stitching is performed by a distortion correction and stitching block 386. Final color and white level blending is performed in a back end color and white level blending block 388. The fully corrected frames are provided for videoconferencing operations as needed, such as participant detection and framing.

In one example, the front-end color and exposure matching block 382 only operates periodically, not on every received frame. In one example, the front-end color and exposure matching block 382 operates once every five seconds, though other rates can be used based on processing capabilities and changing nature of the scene being captured. In contrast, correction block 384, distortion correction and stitching block 386 and back end color and white level blending block 388 operate on every received frame from each camera.

Figure 8:
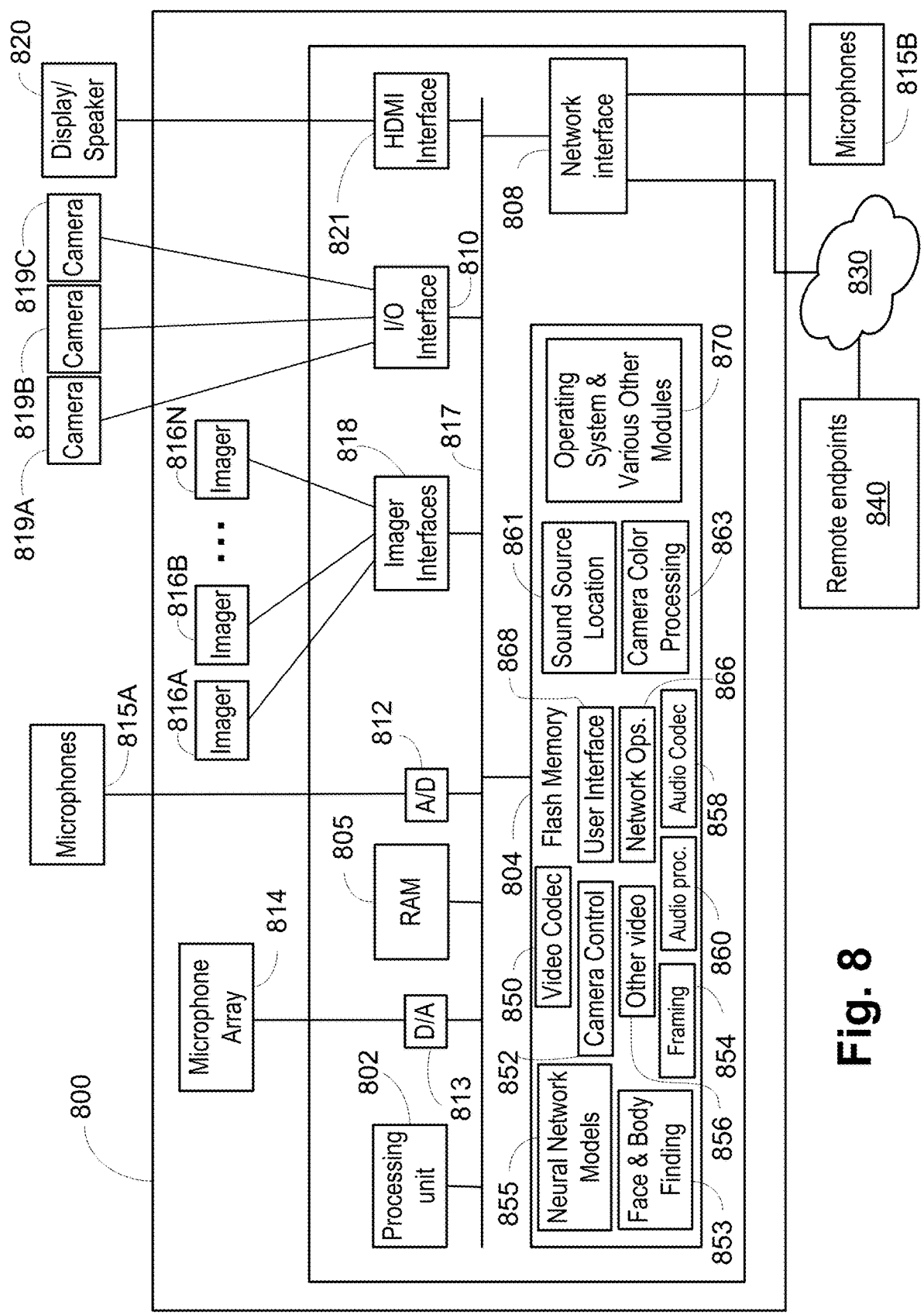
FIG. 8 is a block diagram of a videoconferencing endpoint according to an example of the present disclosure.

FIG. 4B is a block diagram of the front-end color and exposure matching block 382 which is performed by camera color processing 863 (FIG. 8). The front-end color and exposure matching block 382 addresses exposure and color imbalances in multi-camera systems where the cameras overlap. The front-end color and exposure matching block 382 stores some number of frames in the RGB color space from each camera that overlaps. The front-end color and exposure matching block 382 also stores camera overlap information. The frames are received real time while the overlap information is provided at initialization.

The front-end color and exposure matching block 382 includes six different blocks, with two different pathways, one for color and one for exposure. Video frames from each camera, such as cameras TP and WA or A-D, are provided to a front-end coordinator 402, which prepares and holds the frames for use. When the front-end coordinator 402 has stored a desired number of frames for a given camera, the front-end coordinator 402 sends the individual channel data to the corresponding pathways. Luminance data L* is provided to an exposure stats gatherer 404. R, G, and B data is provided to the color stats gatherers 406R, 406G, 406B, generally 406. The exposure stats gatherer 404 and color stats gatherers 406R, 406G, 406B take the data received from the front-end coordinator 402 and each buckets the channel data into usable histograms based on overlap. Once the histograms are created for each channel, the data is provided to an exposure stats processor 408 and to color stats processors 410R, 410B, 410G. The exposure stats processor 408 and the color stats processors 410R, 410B, 410G analyze their respective histograms by detecting peaks and calculating subset averages. While separate exposure stats processor 408 and color stats processors 410R, 410B, 410G are illustrated, the exposure stats processor 408 and the color stats processors 410R, 410B, 410G perform essentially the same task, but with different sets of tuning. When the exposure stats processor 408 and the color stats processors 410R, 410B, 410G have determined their respective channel to be over or under saturated, a message is sent to a front-end control block 412 stating which cameras must be adjusted. The front-end control block 412 determines the adjustment for each individual camera. This process is cyclical, so each time an adjustment is made, the forthcoming new frames are analyzed for any further adjustments.

Figure 5A:
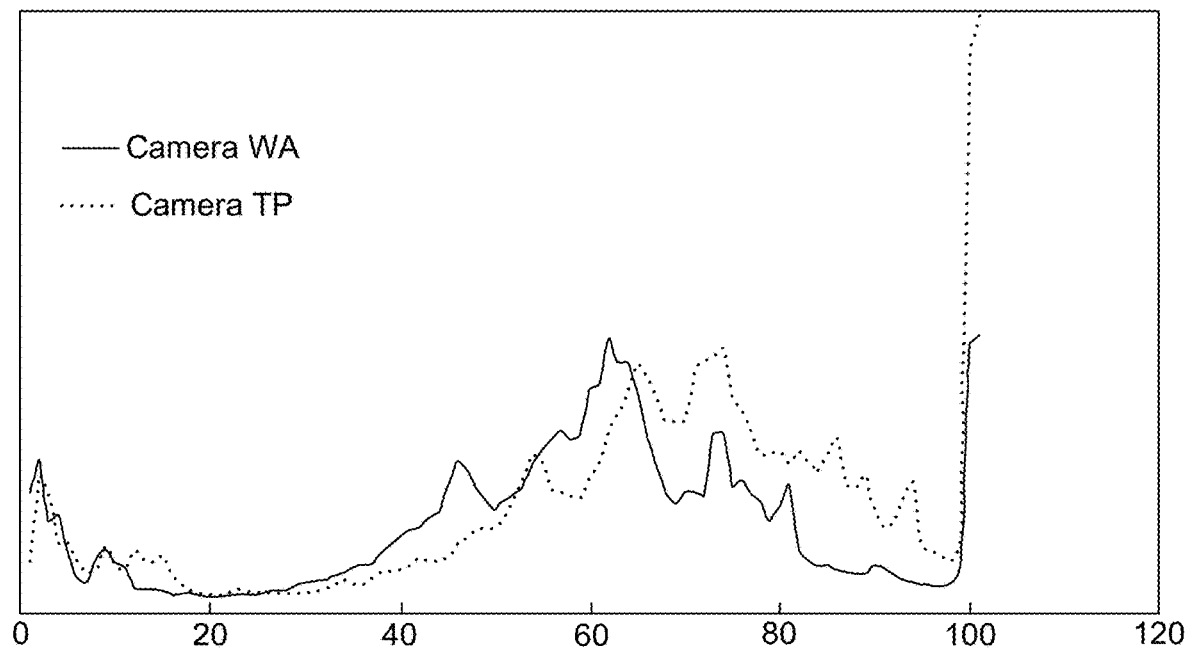
FIG. 5A is the before luminance histograms of the cameras TP and WA of FIG. 1.
Figure 5B:
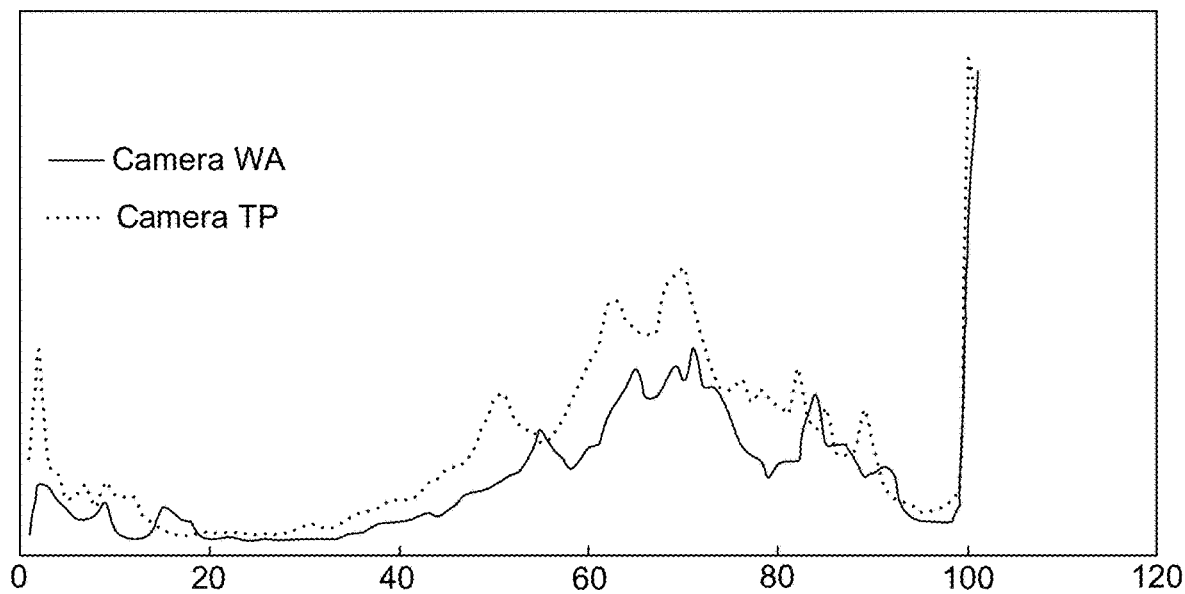
FIG. 5B is the after luminance histograms of the cameras TP and WA of FIG. 1.

FIG. 5A is a histogram of perceived lightness L* for cameras WA and TP before correction. The values go to 100 instead of 255 because of the conversion to perceived lightness L*. As can be seen, camera TP tends to be brighter than camera WA. FIG. 5B is a histogram of perceived lightness L* for cameras WA and TP after correction. As can be seen, the perceived lightness of the two cameras WA and TP is much closer.

Figure 6:
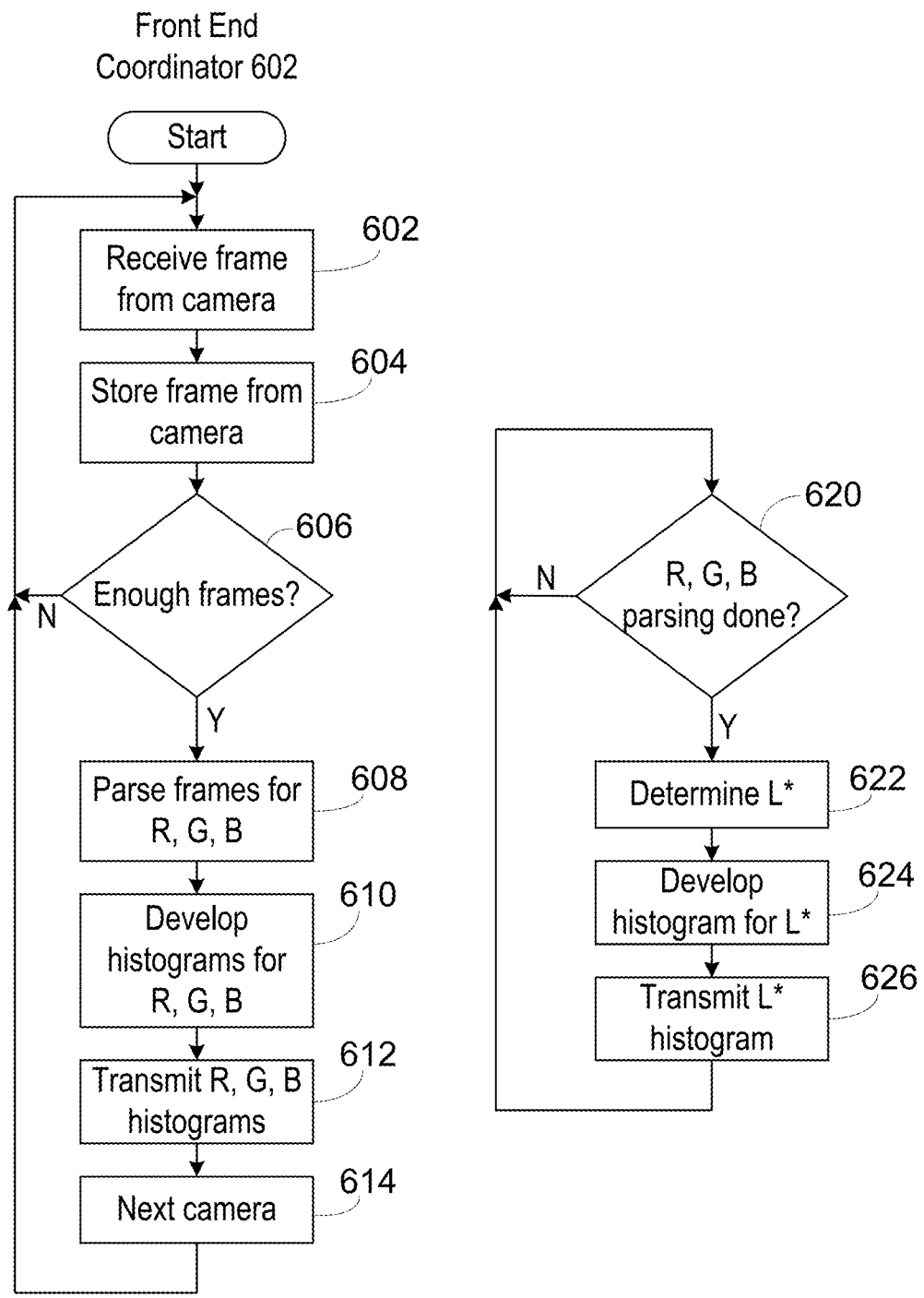
FIG. 6 is a flowchart of operation of the front-end coordinator of FIG. 4.

Referring to FIG. 6, operation of the front-end coordinator 402 is shown. In step 602, a frame is received from a camera being processed. In step 604, that received frame is stored. In step 606, a determination is made if enough frames have been received from the camera being processed. In some examples, only a single frame from each camera is used for analysis but in other examples a number of frames from each camera, such as two or three, are averaged to provide more stable color values for processing. If not, processing returns to step 602 to await the next frame. If enough frames have been stored, in step 608 the frames are parsed, and averaged if necessary, to provide separate R, G and B frame data. In step 610, R, G and B histograms are developed. In step 612, the R, G and B histograms are transmitted to the color stats gathers 406R, 406G and 406B. In step 614, the next camera is set for frame capture and storage. The cameras that are analyzed rotate through the cameras that have overlaps. For the example of FIG. 1, the cameras alternate between camera TP and camera WA. For the example of FIG. 3, the cameras sequence from camera A to camera B to camera C to camera D and back to camera A. Operation returns to step 602 to start storing frames from the newly set camera.

In a parallel thread, perceived lightness L*, is determined. In step 620, it is determined if step 608 has completed for the given frame. If not, operation stays at step 620 waiting for the next R, G and B values. If so, in step 622 the perceived lightness values are developed. Perceived lightness (L*) is the visual perception of luminance. Essentially it is how the eye sees how "bright" or "illuminated" a scene may be. A common way to solve brightness issues is to analyze the luma channel (the Y in YUV), but the luma channel is not linearized, meaning it is not a very accurate way to determine overall brightness of a pixel, with lower values and higher values being much darker and brighter, respectively, than the values held in the middle. This causes problems when trying to adjust brightness in an iterative process. For example, raising the brightness from 10 to 15 may require only single iteration. However, raising the brightness from 110 to 115 would require several iterations since each change translates to smaller numerical adjustments in the luma channel.

Perceived lightness is a conversion from YUV space which allows adjustments to be made in linear space, allowing for a consistent adjustment curve across all values of the channel. A note for the perceived lightness channel is that the maximum value is 100, not 255, so this must be taken into consideration when analyzing this channel. The formula to convert RGB to the non-linearized luma channel and then into the perceived lightness channel is as follows (the first two steps apply to all three channels in RGB space, hence the dot division):

$$sRGB = RGB_v/255$$

$$vRGB = sRGB^{2.2}$$

$Y = aR_v + bG_v + cB_v$, where $a$, $b$, and $c$ are 0.2126, 0.7152, and 0.0722 respectively. These are standard values for RGB to luma conversion.

$$L^* = Y * 903.3 \text{ if } Y \leq 0.008856$$

$$L^* = Y^{\frac{1}{3}} * 116 - 16 \text{ if } Y > 0.008856$$

After the L* values are determined, in step 624 the L* histogram is developed. As discussed above, this histogram has only 100 entries, as opposed to the R, G and B histograms, which have 256 entries. In the step 626, the L* histogram is provided to the exposure stats gatherer 404.

The exposure stats gatherer 404 and color stats gathers 406R, 406G and 406B perform essentially the same operations. The exposure stats gatherer 404 and color stats gathers 406R, 406G and 406B each develop a data structure around the histogram information received from the front-end coordinator 402. The data structure has the following fields: camera ID, histogram(s), view type, and overlap type. The camera ID is an indexed locally unique identifier used to maintain context for the histograms and other data. The view type indicates whether a given histogram is a full view or subsection of a view. Overlap type is a value that corresponds to the overlap between the cameras in a camera system. The example of FIGS. 1A and 1B is a first type of overlap, the example of FIGS. 2A and 2B is a second type of overlap and the example of FIGS. 3A and 3B is a third type of overlap. The overlap type value is a pointer to a table or similar structure that defines the details of the overlaps for that overlap type, with boundary locations and the like. These details of the overlaps are used to determine a confidence level based on percentage overlap and perspective.

Once the relevant data structure is populated, the exposure stats gatherer 404 and color stats gathers 406R, 406G and 406B send the data structure to the corresponding exposure stats processor 408 and the color stats processors 410R, 410B, 410G and prepare for the next batch of frames by cleaning up unused data.

Figure 7A:
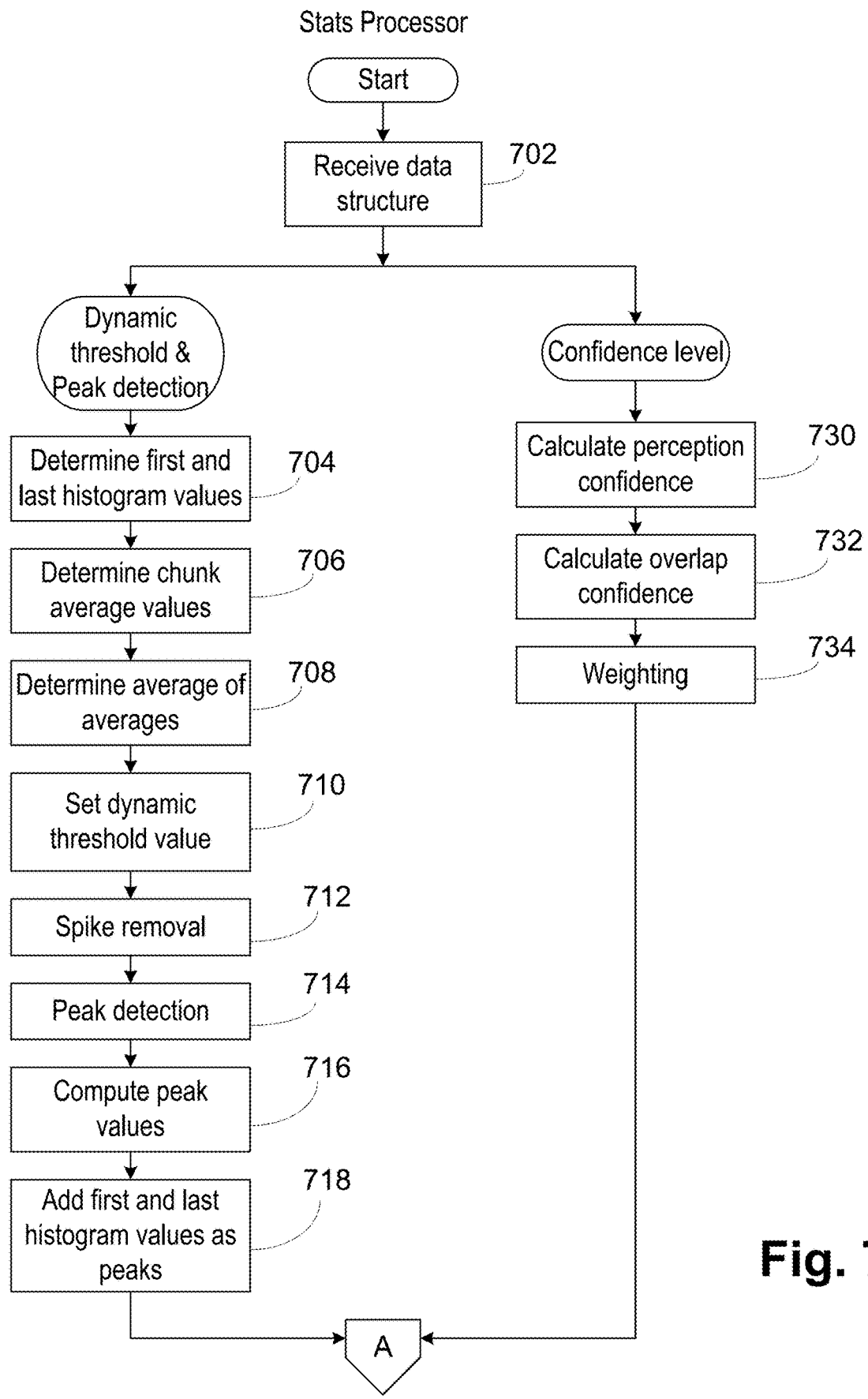
FIGS. 7A-7G are flowcharts of operation of the stats processors of FIG. 4.

The stats processors 408, 410R, 410G and 410B are where the bulk of the processing is performed. The input to each of the stats processors 408, 410R, 410G and 410B is the data structure developed by the respective stats gather 404, 406R, 406G and 406B, shown as step 702 in FIG. 7A. In some examples the previous changes are provided to the stats processors 408, 410R, 410G and 410B. The stats processors 408, 410R, 410G and 410B have four primary areas in which processing is done: peak detection, confidence level, histogram analysis, and adjustment advisory. As discussed before, the primary difference between color and exposure blocks are that the processing is done for three separate channels in the color block but only operates on a single channel for the exposure block. Effectively the color stats processors 410R, 410G and 410B execute as independent parallel threads of the same processing steps.

Once the stats processors 408, 410R, 410G, 410B have received the necessary data in step 702, the first step is peak detection. Each stats processor 408, 410R, 410G, 410B analyzes each histogram independently for the location of peaks on the respective histogram. The peaks are scanned, and a dynamic threshold is created. The dynamic threshold is a value that indicates a minimum value for a peak to occur. Any point that falls above the dynamic threshold line is considered a part of a potential peak. There are further tuning variables that are used to determine what is and is not a peak: minimum width, average value, and fall of percentage. If a point in a peak drops below the dynamic threshold, the fall off percentage is checked to determine if it is just a small drop off (peak does not end) or actually the end of a peak (peak is finished and a new peak is actively being looked for). This analysis does not depend on the absolute value of the histograms, rather all calculations are done a relative basis. The average value is used to set the dynamic threshold break. Fall off percentage is a percentage, not an absolute value. This method of analysis makes the calculations independent of resolution, allowing for cameras of varying resolutions to be processed. Once all of the peaks have been discovered, the information is packaged into a data structure for use later and the next camera's histogram is looked at.

In more detail, a peak is classified as any range of histogram values that break a certain threshold height for a certain length across the histogram. The height is dynamically determined based on the average value of the histogram, hence the term dynamic thresholding.

The first operation in peak detection is to find the average value of the histogram. In step 704 the ends of the histogram, value 0 and 100 for perceived lightness and 0 and 255 for RGB channels, are weighted differently due to an oversaturation of the channel. In some examples, the end values are divided by two and that value is used. For the remainder of the histogram, in step 706 the average of a chunk of histogram values, such as eleven values is determined for all chunks. In step 708, the average of the averages, the average of the end values and the chunk average values, is determined. The resulting value is set as the dynamic threshold value in step 710. In some examples a scaling factor, such as 1.2, can be applied to the average of averages value to set the dynamic threshold. The scaling factor can be determined by experimentation to find the value that provides the best appearing results.

In step 712, spikes are removed. A peak is considered any area where the dynamic threshold is exceeded. But spikes may be present and are filtered out by discarding any range of consecutive histogram values exceeding the dynamic threshold that is not a given number of units, such as four, wide. Additionally, the first and last histogram values are removed, as those values represent the areas where the image is too dark or too bright to be captured and are generally only one value wide above the threshold. The first and last histogram values are added back in later in the process.

Once the dynamic threshold has been determined and spikes removed, the histogram is ready for peak detection in step 714. The histogram array is scanned in order looking for values higher than the dynamic threshold, counting the number of values past a break over the dynamic threshold. Normally, if the histogram value drops below the dynamic threshold, it is considered the end of the peak. However, if the number of consecutive histogram values below the dynamic threshold is a small number, such as two, this is considered a temporary break and the peak continues past the two values so that there is just a single peak, not two peaks. At the end of determining each peak, in step 716, the maximum value, total number of pixels and range of the peak is calculated In step 718, the first and last values, 0 and 100 for perceived lightness and 0 and 255 for RGB channels, are added as peaks. This completes peak detection.

Confidence level is determined simultaneously with the dynamic threshold and peak detection. The confidence level is determined based on the overlap matrix and viewing angle provided for a particular camera relationship. These values are either provided by the manufacturer where the camera relationships are fixed, as in the examples of FIGS. 1A and 2A, or by the user where the camera relationships are not fixed at the manufacturer but are dependent on the location of individual cameras in a room, as in the example of FIG. 3A. Based on the angle and this overlap matrix, each camera's relevance in the correction of another camera is analyzed. For example, if two cameras share no overlap area in their field of view, then the processor holds the confidence level between these two cameras as zero, as with cameras A and C in FIG. 2A. However, if these one of the cameras is a subsection of the other camera with a zero-degree viewing angle difference, as with the cameras WA and TP in FIG. 1A, this relationship is assigned 100% confidence, since a change in one affects the relationship to the fullest extent the change is capable. The lower the confidence level, the lower that particular camera relationship is weighted in the final change. All these confidence levels are then sorted and the relationships with the highest confidence levels are analyzed first, descending to the least confident overlap in case operations must be limited due to overall system processor usage.

Confidence level is a combination of two factors, the perception confidence and the overlap confidence. Perception confidence is based on the relationship between the viewing angle difference between the two cameras. The viewing angle difference is determined as the angle offsets in a spherical coordinate system. The vertical or polar angle $\theta$ and horizontal or azimuth angle $\psi$ differences provide the perception offset. The closer $\psi$ and $\theta$ get to 0 degrees, the more confidence attributed to the cameras' relationship. In step 730, a perception confidence formula is computed.

$$\text{Perception Confidence}(\%) = 100 - 100*(\theta+\psi)/360$$

The more important factor is the percentage overlap of the frames. As discussed, the overlap is provided by the manufacturer or by the user at system setup. In step 732, an overlap confidence is computed.

$$\text{Overlap Confidence (\%)} = 100 * \frac{\text{Pixels Overlapped}}{\text{Average Total Pixels in frame}}$$

In step 734, the perception confidence and overlap confidence are weighted to provide a total confidence value.

$$\text{Total Confidence (\%)} = \frac{3*\text{Overlap Confidence} + \text{Perception Confidence}}{4}$$

When the total confidence value is computed and the peaks for each camera are determined, histogram comparisons are made to lead to any needed corrections. Histogram analysis is performed to determine if there is a substantial difference in channel saturation between two cameras. If there is a substantial difference, then one camera is designated as either "Over Saturated" or "Greatly Over Saturated" and the same for undersaturated. Histogram analysis directly compares a total of two histograms at any point in time. Briefly, each relationship is analyzed based on number of peaks and how well the peaks match and are compared against an expected outcome. Based on overlap type and field of view angle difference, an inference is made about what a histogram comparison should look like. If the histogram comparison matches the expectation, the adjustment is easily created, by determining which channel is more saturated and which one is less and designating them accordingly. If the relationship does not match expectations, the stats processors 408, 410R, 410G and 410B attempt to find the reason why by analyzing placement and density of peaks in each histogram. These expectations are weighted more heavily for relationships that have a zero-degree field of view difference. The larger the field of view angle difference, the less predictable histograms become. The first attribute looked at is number of peaks. For each given type of overlap, there is an expected relationship between the number of peaks of one camera to the other. For example, for a camera that is a subset of another camera, as in FIG. 1A, the expectations are that the number of camera WA wide peaks will be greater than the number of camera TP, although this is not always the case due to peaks combining in the wide to form one large peak. The location of the peaks are analyzed, looking for an over/under representation of peaks in a designated area of the histograms. The stats processors 408, 410R, 410G and 410B then have final judgement done on the graph based on the cumulation of previously mentioned factors to decide whether a channel is over or under saturated. Once this final step has completed, it is ready for the adjustment step.

Proceeding now in more detail, prior to direct comparisons, the stats processors 408, 410R, 410G and 410B make assumptions of what the histograms should be in comparison to one another. These are rather basic shapes and are useful in certain circumstances. In those circumstances the assumptions are useful as the guesses are extremely accurate and provide information about the relative saturation of the channels if the guess is deemed relevant.

Figure 7B:
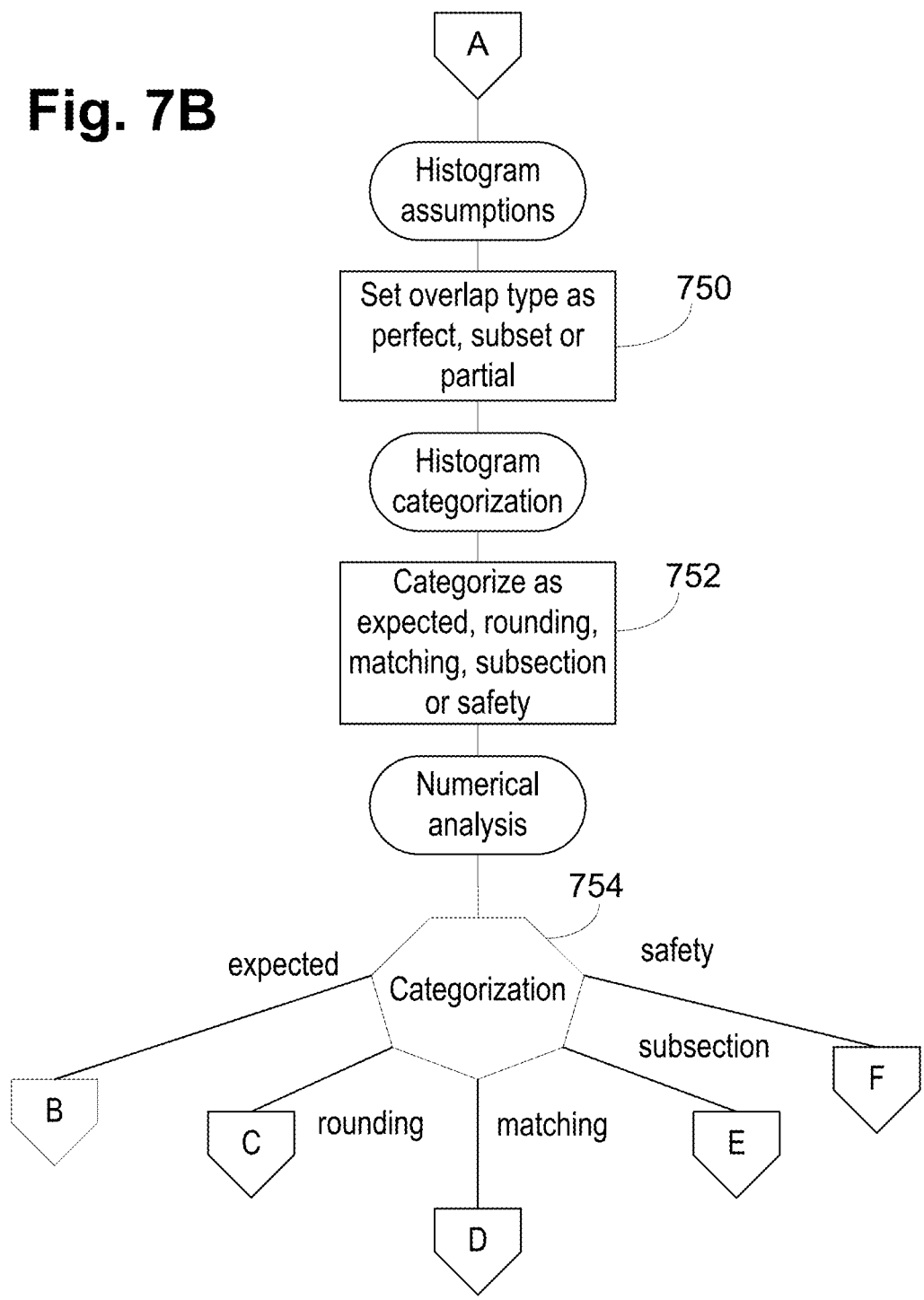

The assumptions are based on overlap type as determined in step 750 (FIG. 7B). There are three categories overlap: perfect, subset, and partial. Perfect overlap is where both camera feeds are perfectly, or with negligible error, overlapped on top of one another. This situation occurs typically when one image's histogram is cropped down to just contain the information displayed from a separate camera. In this situation, the histograms are roughly the same shape, though the pixel counts may differ. What is adjusted is the ratio of a peak's saturation in comparison to the other peaks of the graph. The second overlap type is subset, which is where one camera's histogram should be a subset of another since all of one camera's feed is contained in a second camera's feed. FIG. 1A is an example of subset overlap, as the view of camera TP is 100% seen by camera WA, but with lesser detail. The assumption of this overlap type is that any peak that exists in the smaller field-of-view (FOV) camera exists in the larger FOV camera, but there can be peaks in the larger FOV camera image that do not exist in the smaller FOV.

There is one exception to this assumption, called "ghost" (or rounded) peaks. There exists a situation that two peaks from the smaller FOV camera get morphed into one peak on the larger FOV camera, due to a third "ghost" peak in between the two peaks. For such a case, the stats processors 408, 410R, 410G and 410B scan for this situation and if it is detected, it is acceptable for the stats processors 408, 410R, 410G and 410B to consider the two peaks from the smaller FOV cameras as one solid peak.

The third overlap type is much more ambiguous and is called partial. This encompasses every situation that does not fit one of the previous two categories. In this situation it is known that some area of both camera FOV's are not shared and some area is shared, meaning there will be peaks that match and peaks that do not on both graphs. It is also important to note that ghost peaks can exist in this circumstance as well.

With the assumptions made, categorization of each histogram set is performed next in step 752. Operating off the assumptions, each histogram set is classified in one of five ways: expected, rounding, matching, subsection, and safety. Expected is the case where the peaks match exactly the assumption made in the previous step. The second case, rounded, means that a ghost peak has been detected but otherwise the histogram set is expected. Matching refers to a one-to-one match between peaks in the histogram set. This does not mean that the case is necessarily expected, and some correction can still be needed. Subsection is a category for the case where one or both fields of view are trimmed down to get a matching FOV between the two cameras. If this categorization can be made, the processing becomes easy and averages are compared once the peripheral peaks, peaks present on wider FOV that are not present on narrower FOV, are factored out on the wider FOV camera. If none of these conditions are met, the safety case is triggered, which means that nothing is assumed from the histogram shape and additional processing is needed when considering what changes to make.

The numerical analysis section of the stats processors 408, 410R, 410G and 410B refers to analyzing the already categorized histogram set and identifying if a channel is over, under, or perfectly saturated. For each type of histogram set categorization, the processing is different as different assumptions can/cannot be made. The five different categories of histogram sets are addressed individually as determined in step 754. When analyzing the histogram sets, the stats processors 408, 410R, 410G and 410B look at the following histogram characteristics:

Ratio of pixels of peak to total pixels and to each other peak's pixel total, locally to the same histogram Average pixel value End pixel count, the values at 0 and max, 100 or 255, on the histogram Histogram categorization and assumptions Previous change history Peak attributes—height, width, density, standard deviation, location, ghost peak detection, medians The stats processors 408, 410R, 410G and 410B quantify one change as what will theoretically shift the graph upwards about a tenth of the max value (0.1*max value) to the histogram's average. This is modified by the squishing on the ends, since at the ends the values cannot go below zero or above the max value, resulting in some pixel values near the top and bottom ends being quantized into the 0 and max values. It is useful to consider the one change as having no more than a tenth of the max value (0.1*max value) change to the histogram average. This specific quantity of a change will not be possible in all instances, so there is a stability algorithm to account for errors in this situation, which will be discussed below.

Figure 7C:
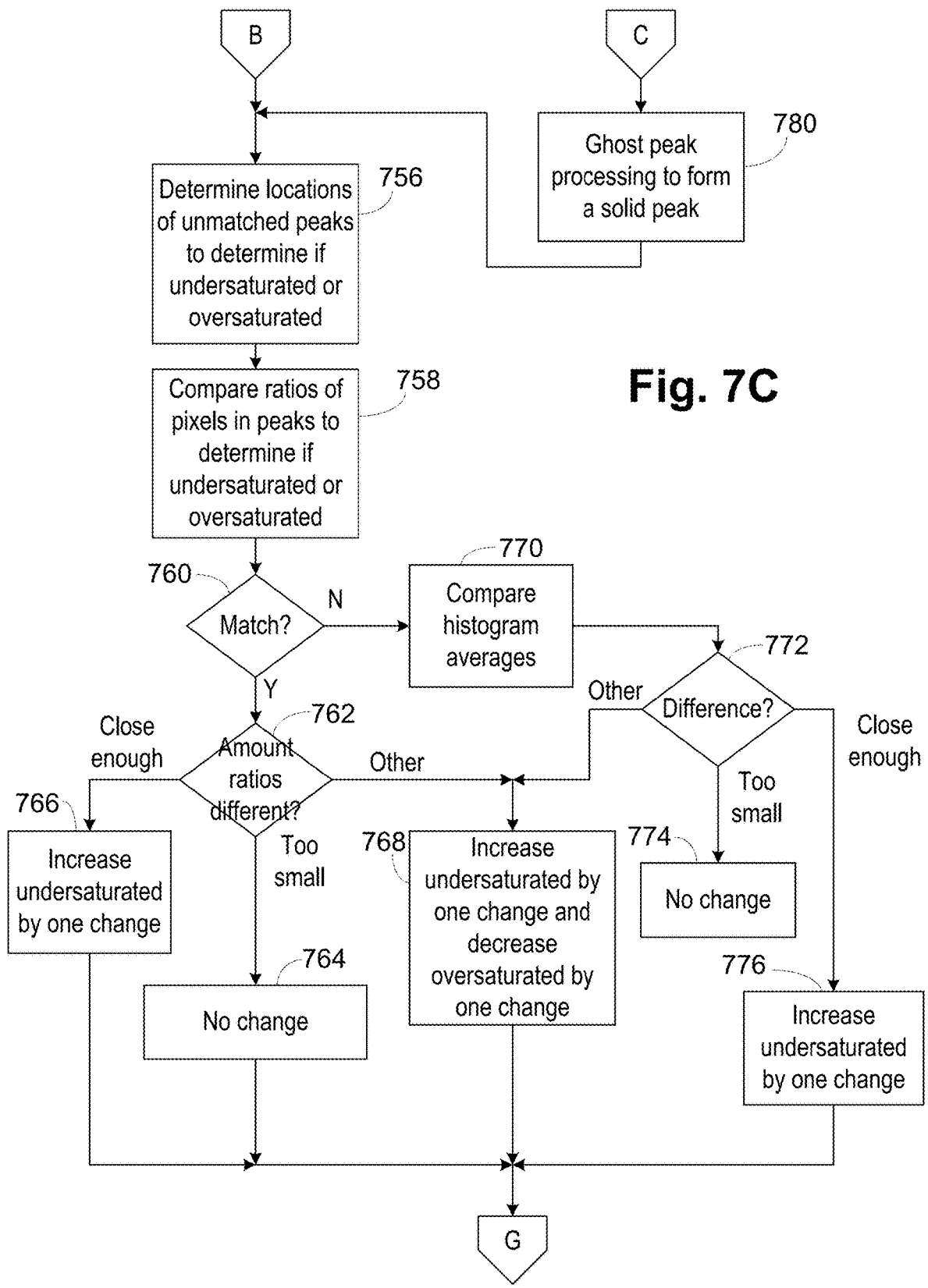

Expected Case:

Since the shape of the histogram matches the expected outcome in this case, stats processors 408, 410R, 410G and 410B can operate without concerns for ghost peaks. Since the ghost peak detection is set to zero in this case, step 756 (FIG. 7C) looks at the location of unmatched peaks. The location of the unmatched peaks provides information about the relative state of channel saturation. If an unmatched peak is to the left of the overall average of the histogram of the other camera (aka counter camera), the channel is assumed to be undersaturated, and vice versa if the peak lies to the right of the other camera's average.

In step 758, analyze the ratios of pixels in peaks to the total number of pixels in the frame to the counter camera's ratios for all peaks. The stats processors 408, 410R, 410G and 410B examine the ratio of pixels in peaks that are above the overall average (total peak pixels over average pixel value/total pixel of histogram) to that of the counter camera and compare that to the ratio of the pixels of peaks lower than the average to determine if undersaturated or oversaturated. In one example, this is performed using weighted values, where the weighting is the peak proportion times the distance from the median for each peak. The sum of the weights for the counter camera is subtracted from the sum of the weights of the camera. If the result is positive, the camera is oversaturated, and if negative is undersaturated. In step 760, determine if the under or oversaturated determination of step 758 matches the determination of step 756. The closeness of the ratios of step 758 is considered in step 762. If the difference between the two histograms is deemed too small, in step 764 no change is performed. In one example, too small is determined by taking the absolute value of the difference value determined in step 758 and comparing to a fixed value, such as two. If two or less, then the difference between two histograms is considered too small to need any changes. If the stats processors 408, 410R, 410G and 410B decide the ratios are close enough, then in step 766 adjust the channel that is undersaturated up by one count and leave the oversaturated channel alone. In one example, close enough is determined by taking the absolute value of the difference value determined in step 758 and determining if the absolute value is in a selected range, such as two to eight. If neither case is true, in step 768, adjust the perceived undersaturated channel up and the oversaturated channel down by one change.

In the case that the first analysis for the expected case does not match the second analysis, in step 770 compare averages of histograms. If too small in step 772, in step 774 no change is necessary. In one example, too small is determined by subtracting the histogram average of the counter camera from the histogram average of the camera and determining if the absolute value of the difference is between two or less. If close enough in step 772, then in step 776 adjust the channel that is undersaturated up by one count and leave the oversaturated channel alone. In one example, close enough is determined by subtracting the histogram average of the counter camera from the histogram average of the camera and determining if the absolute value of the difference is between two and eight. If not close enough, in step 768 adjust the perceived undersaturated channel up and the oversaturated channel down by one change.

Once both of these factors have been analyzed, the expected case is considered solved and the changes, if any, are implemented.

Rounded Case:

The rounded case is essentially the same as the expected, except an operation is performed on the ghost peak's counter camera peak. In step 780, the stats processors 408, 410R, 410G and 410B take the location of the ghost peak, the two peaks plus the ghost peak in-between, and cross reference that location or domain to the counter camera's histogram. Any pixel value that breaks the thresholding in that domain is considered to be one solid or single peak. Simplifying the analysis in this way allows the stats processors 408, 410R, 410G and 410B to do the cross examination mentioned in the expected case. After this combination of peaks occurs, the stats processors 408, 410R, 410G and 410B processes in the same manner as the expected case, starting at step 756.

Figure 7D:
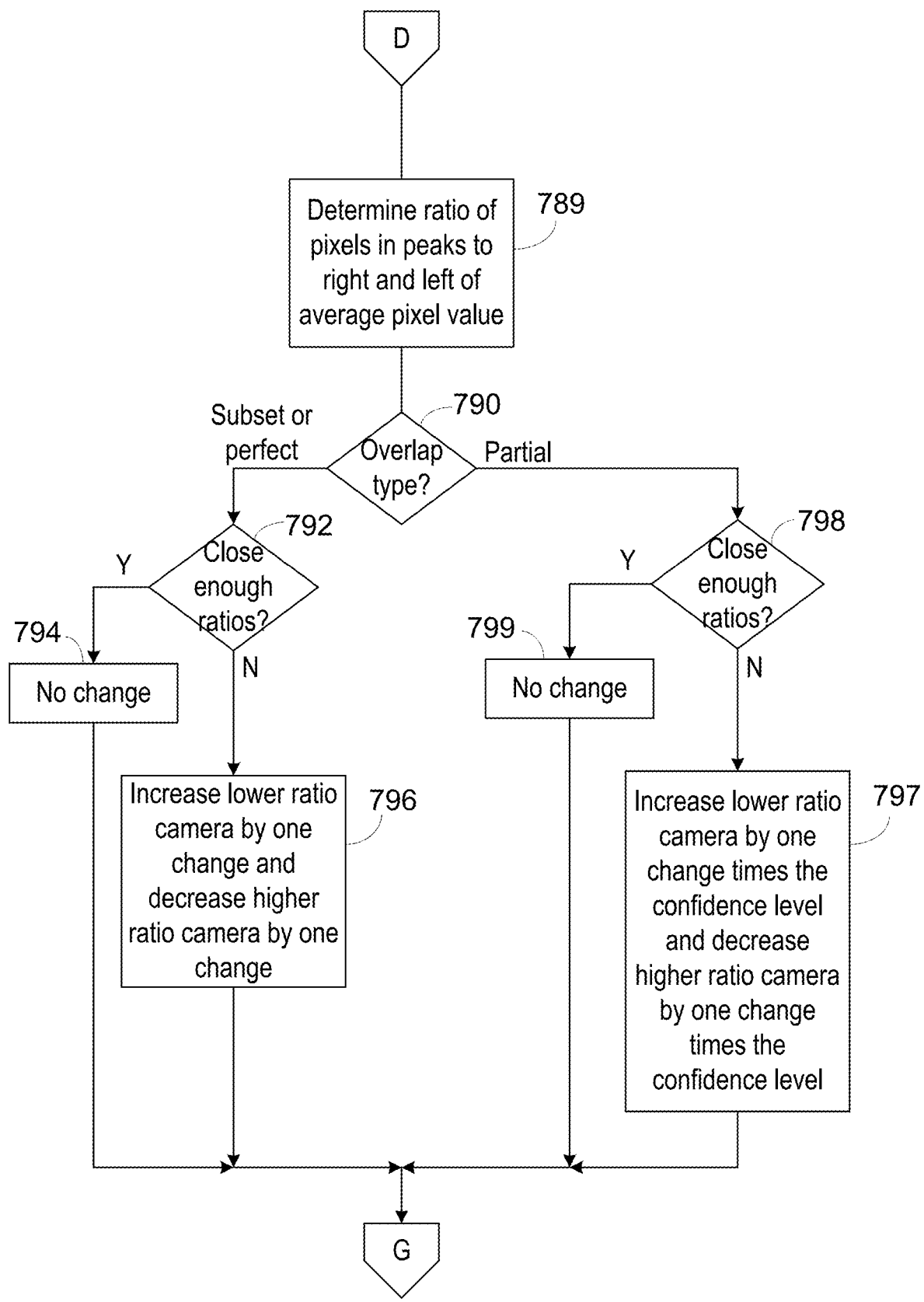

Matching Case:

The matching case uses peak ratio analysis in most cases. In step 789 (FIG. 7D), the ratio of pixels in peaks to the right and to the left of the average pixel value is determined for each histogram. Overlap type is determined in step 790. If the overlap type is either subset or perfect, in step 792 the determined ratios are compared. If the ratios are close enough, in step 794 no change is needed. In one example, close is if the ratios have less than a 10% variance. If the ratios are not close enough, in step 796 adjust the camera with the lower ratio up one change and the camera with the higher ratio down one change.

If the overlap type is partial and the peaks are matching, the stats processors 408, 410R, 410G and 410B factor in the confidence level. The same ratio comparison occurs in step 798. If close enough, in step 799 no change is needed. If not close enough, in step 797 the overall change is multiplied by the confidence level (in percent). A higher confidence level indicates more overlap, so the higher the overlap, the more likely that the histograms are matching. But at low confidence levels, the low confidence level teaches to limit the changes, even if the histogram shapes are equivalent.

Figure 7E:
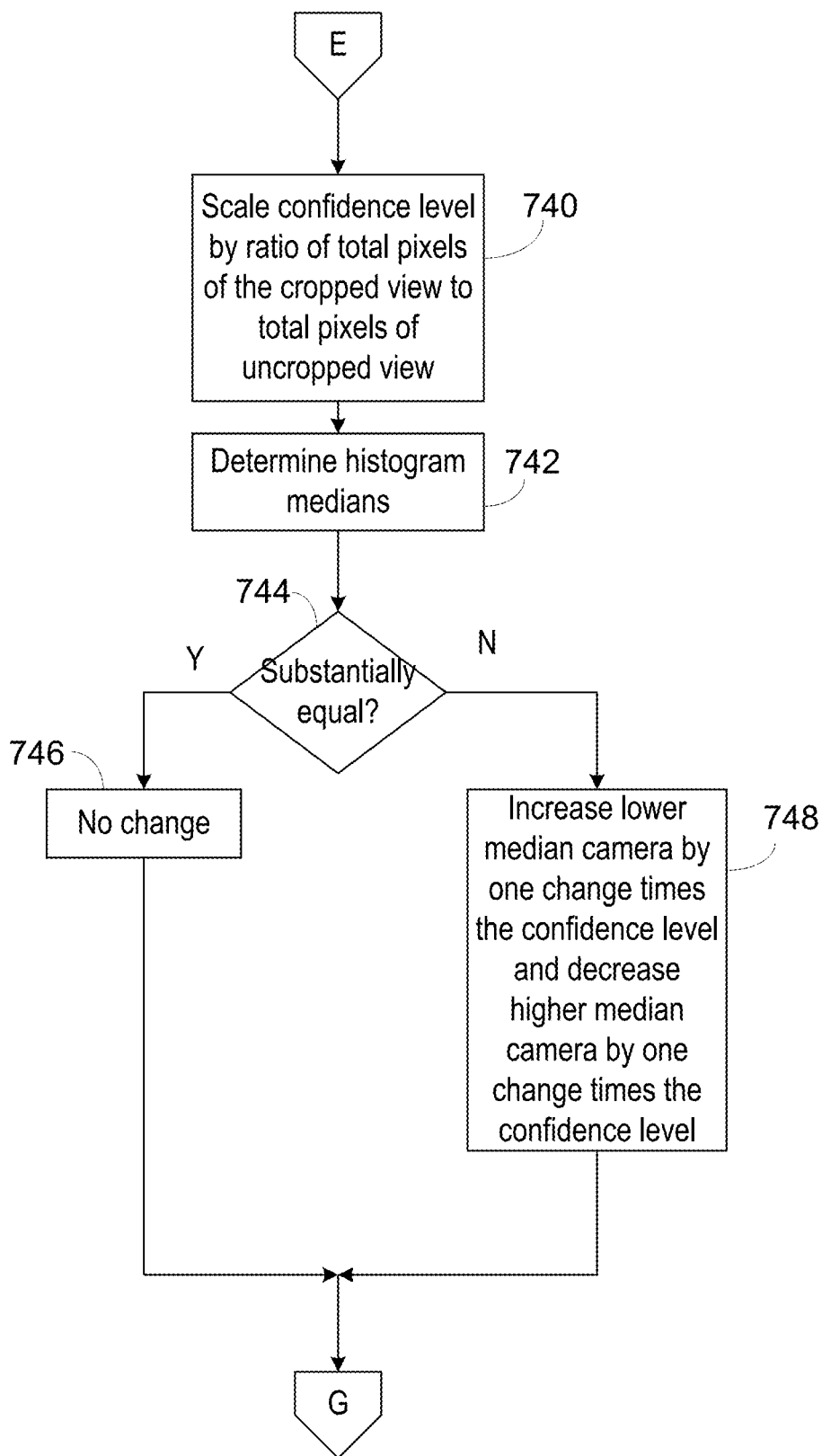

Subsection Case:

The key assumption for the subsection case is that the overlap type is perfect or something approximately perfect. In step 740 (FIG. 7E), since one or both fields of view are trimmed, the confidence level is scaled down based on the ratio of total pixels of the cropped view to the total number of pixels of the uncropped view. As the confidence level for a perfect matching case is set to 100%, the scalar factor becomes the confidence level. The cross comparison between the two histograms is based on histogram medians, computed in step 742. The medians are evaluated in step 744 and if substantially equal, in step 746 no change is made. In one example, the histogram median of one camera is subtracted from the histogram median of the other camera and absolute value is compared a value of two. If the absolute value of the difference is less than 2, the histogram medians are considered substantially equal. If not substantially equal, in step 748 adjust the camera with the lower median up one change times the adjusted confidence level and the camera with the higher median down one change times the adjusted confidence level.

Figure 7F:
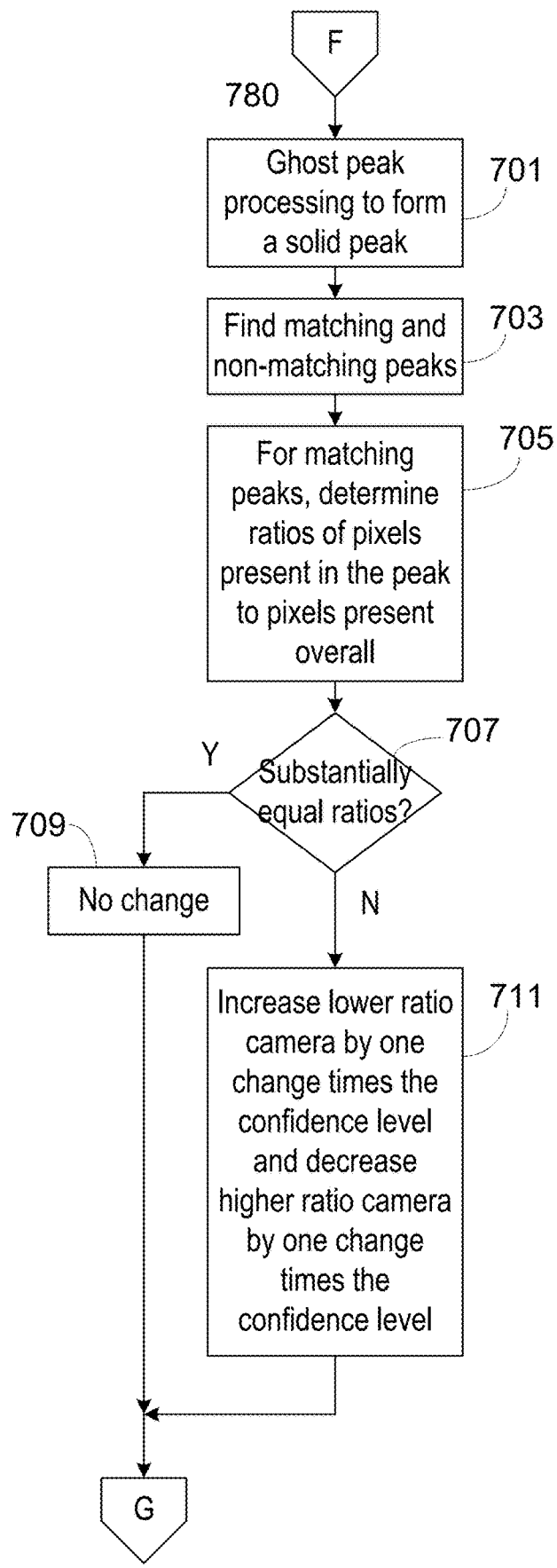

Safety Case:

The safety case is the default case if the criteria to match one of the previous cases is not met. In the safety case, the stats processors 408, 410R, 410G and 410B perform ghost peak processing in step 701 (FIG. 7F), as done in step 708. Next the stats processors 408, 410R, 410G and 410B find the peaks that match and do not match between the two histograms in step 703. In step 705, for matched peaks the ratios of pixels present in the peaks versus the pixels present overall are determined. In step 707 the ratios are compared. If substantially equal, in step 709 no change is made. In one example, this is performed using weighted values, where the weighting is the peak proportion times the distance from the median for each peak. The sum of the weights for the counter camera is subtracted from the sum of the weights of the camera. In one example, too small is determined by taking the absolute value of the difference value and comparing to a fixed value, such as two. If two or less, then the histograms are considered substantially equal. If not substantially equal, in step 711 the camera with the lower ratio is increased one change times the confidence level and the camera with the higher ratio is decreased one change times the confidence level.

Figure 7G:
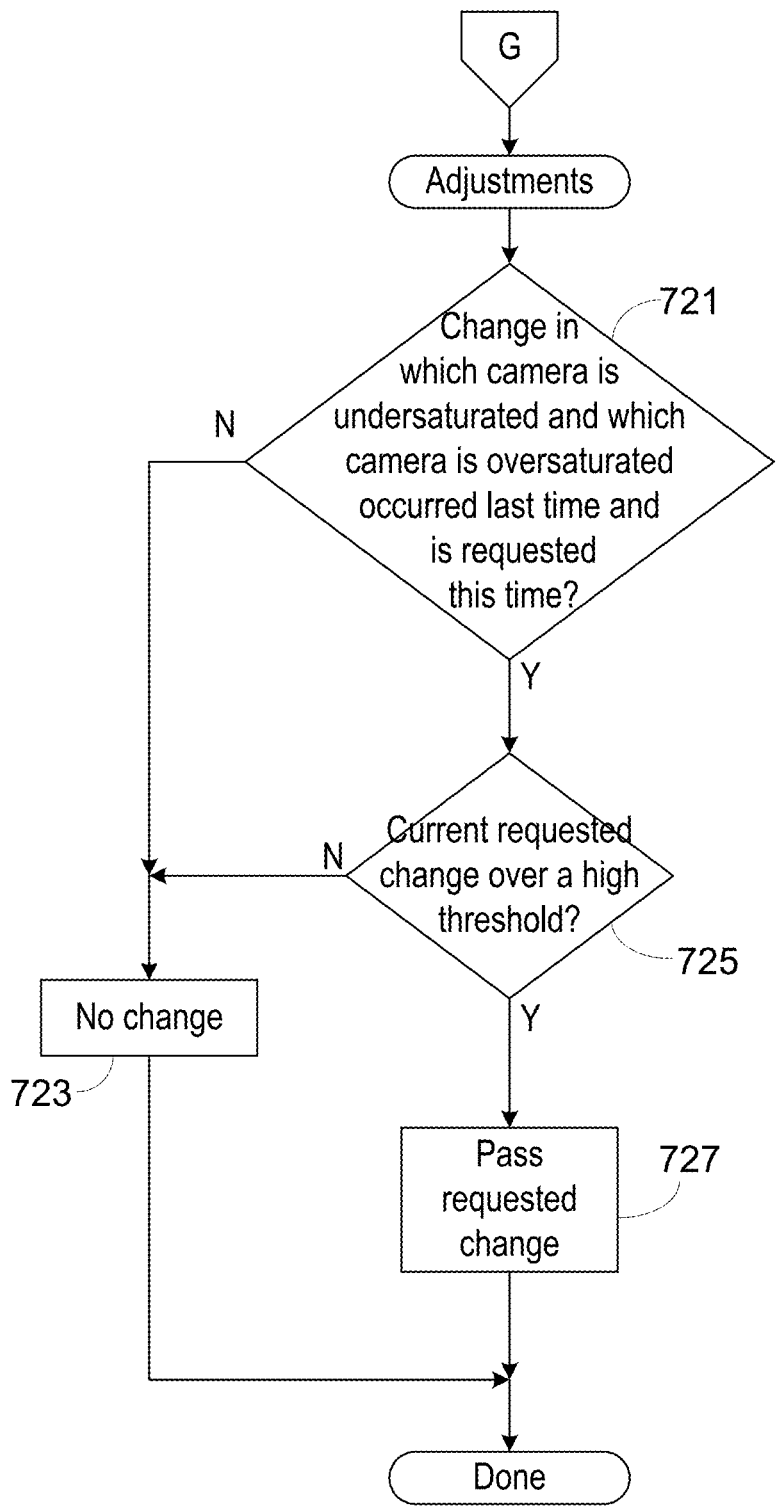

After the appropriate case calculations are complete, a final adjustment check is performed, as shown in FIG. 7G. Normally no changes are made to the camera corrections provided by the relevant case, but there are a few key situations that involve stability where changes may need to be made. The most common situation of concern is a ping-pong affect, where the stats processors 408, 410R, 410G and 410B cannot decide whether an image is over or under saturated and keep making changes in the opposite direction as the previous change. The adjustment check considers the previous changes done in the system and looks for trends to prevent getting into these situations.

Stability adjustments are crucial in keeping the exposure and color level in the correct spot. Step 721 determines if any change alters which camera has the oversaturated channel and which was the undersaturated channel occurred on the previous change request. Said another way, step 712 determines if a change in which overlapping camera is undersaturated and which overlapping camera is oversaturated has occurred in consecutive analyses. If not, then no stability changes are made in step 723. If so, it is determined in step 725 if the current requested change exceeds a high threshold. One example high threshold is three increments, but others can be used if desired. This situation can occur in extremely dim or bright scenes, where the originally estimated one increment change actually may result in a much larger actual change when applied. If the current change does not exceed the high threshold, no change is made in step 723. If the high threshold is exceeded, in step 727 the requested change is carried forward.

The change indications determined by the appropriate case in the stats processors 408, 410R, 410G and 410B are provided to the front-end control block 412. The front-end control block 412 correlates the change indications from the stats processors 408, 410R, 410G and 410B. The front-end control block 412 reviews the prior adjustments and applies the indicated changes to determine the raw or overall adjustment to be performed to the camera raw output. In one example, the front-end control block 412 provides the overall adjustments needed to the respective camera, to allow the camera to adjust the raw camera output as directed. In another example, the overall adjustments are provided to a module in the videoconferencing endpoint to allow the videoconferencing endpoint to correct the incoming frames prior to any other image processing, including prior to the front-end color and exposure matching block 382.

While the above description has each operation of the front-end color and exposure matching block 382 result in an incremental change, as the process is continually performed, after a number of cycles the appropriate complete correction is determined. Given the frequency of operation of the front-end color and exposure matching block 382, the full correction change is not noticeable to a viewer. Further, after videoconferencing endpoint initial operation, the overall adjustments from the prior operation of the videoconferencing endpoint are restored and used as the starting point, rather than adjust each time from scratch. This further reduces the time required to reach full correction in normal use.

By providing the color and exposure matching as an initial operation, the later operation of color and white level blending is simplified, as any needed blending is more limited. As a result, a more uniform overall image is provided than would be provided in the single step operations as previously done. Further, hand calibration is not required, simplifying overall operation.

FIG. 8 illustrates aspects of a videoconferencing endpoint 800 in accordance with an example of this disclosure. The videoconferencing endpoint 800 may include loudspeaker(s) 822, though in many cases the loudspeaker 822 is provided in the monitor 820, and microphone(s) 815A interfaced via interfaces to a bus 817, the microphones 815A through an analog to digital (A/D) converter 812 and the loudspeaker 822 through a digital to analog (D/A) converter 813. A microphone array 814 is connected to a D/A converter 813, which is connected to the bus 817. The videoconferencing endpoint 800 also includes a processing unit 802, a network interface 808, a flash memory 804, RAM 805, and an input/output (I/O) general interface 810, all coupled by bus 817. An imager 816 is connected to an imager interface 818, which is connected to the bus 817. The imager 816 acts as an onboard camera. An external camera 819 can be connected to the I/O interface 810. External local microphone(s) 819A are connected to an A/D converter 812, which is connected to the bus 817. External network microphone(s) 819B are connected to the network interface 808. An HDMI interface 821 is connected to the bus 817 and to the external display or monitor 820. Bus 817 is illustrative and any interconnect between the elements can used, such as Peripheral Component Interconnect Express (PCIe) links and switches, Universal Serial Bus (USB) links and hubs, and combinations thereof.

The processing unit 802 can include digital signal processors (DSPs), central processing units (CPUs), graphics processing units (GPUs), dedicated hardware elements, such as neural network accelerators and hardware videoconferencing endpoints, and the like in any desired combination.

The flash memory 804 stores modules of varying functionality in the form of software and firmware, generically programs or instructions, for controlling the videoconferencing endpoint 800. Illustrated modules include a video codec 850, camera control 852, face and body finding 853, neural network models 855, framing 854, camera color processing 863, other video processing 856, camera location and selection 857, audio codec 858, audio processing 860, sound source localization 861, network operations 866, user interface 868 and operating system and various other modules 870. The RAM 805 is used for storing any of the modules in the flash memory 804 when the module is executing, storing video images of video streams and audio samples of audio streams and can be used for scratchpad operation of the processing unit 802. The camera color processing 863 operates as described below to perform color balancing of cameras having overlapping fields of view and image areas.

The network interface 808 enables communications between the videoconferencing endpoint 800 and other devices and can be wired, wireless or a combination. In one example, the network interface 8o8 is connected or coupled to the Internet 830 to communicate with remote endpoints 840 in a videoconference. In one or more examples, the I/O interface 81o provides data transmission with local devices such as a keyboard, mouse, printer, projector, display, external loudspeakers, additional cameras, and microphone pods, etc.

In one example, the imager 816 and external camera 819 and the microphone array 814 and microphones 815A and 815B capture video and audio, respectively, in the videoconference environment and produce video and audio streams or signals transmitted through the bus 817 to the processing unit 802. In at least one example of this disclosure, the processing unit 802 processes the video and audio using algorithms in the modules stored in the flash memory 804. Processed audio and video streams can be sent to and received from remote devices coupled to network interface 808 and devices coupled to general interface 810. This is just one example of the configuration of a videoconferencing endpoint 800.

Figure 9:
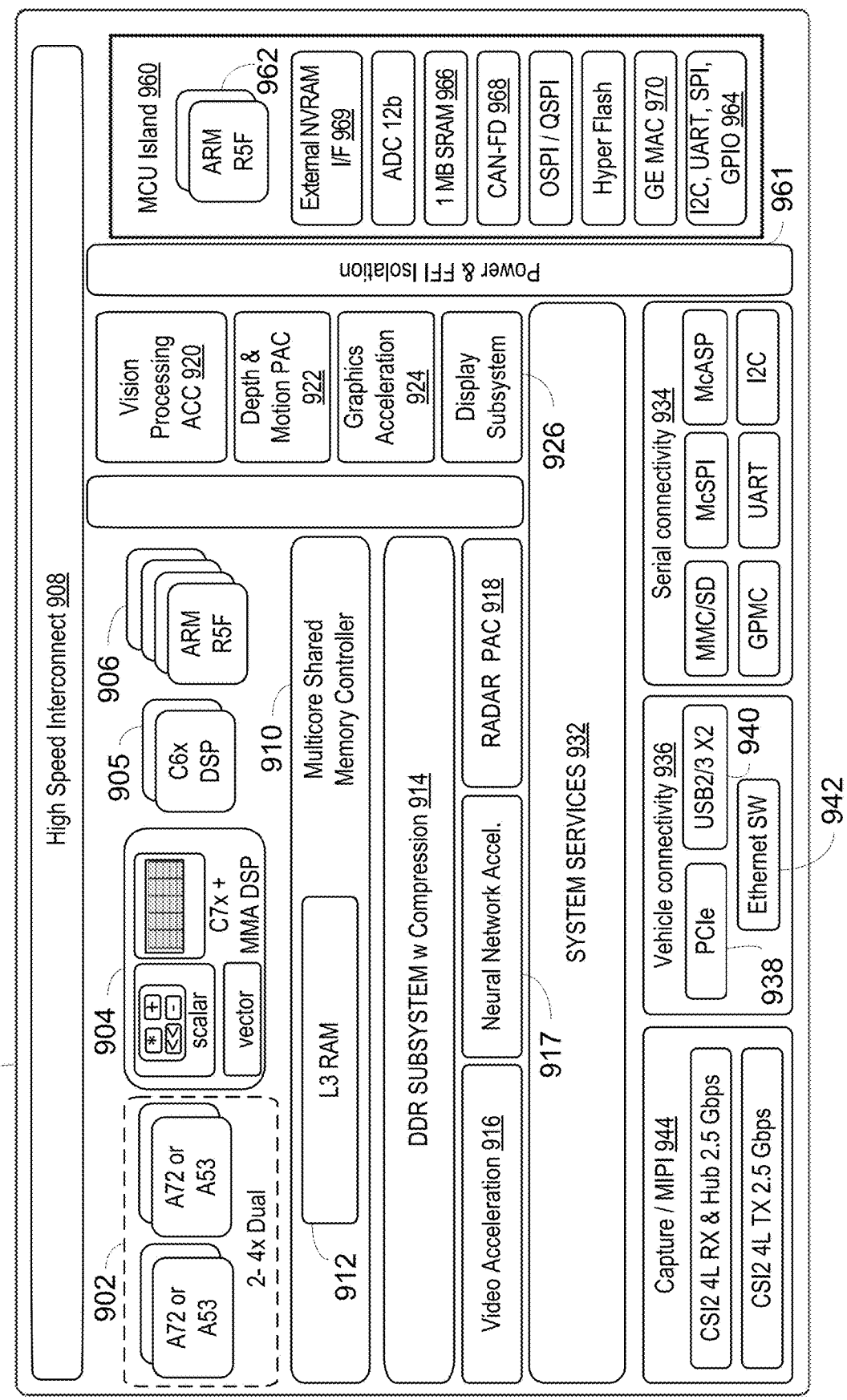
FIG. 9 is a block diagram of the processor unit of FIG. 8.

FIG. 9 is a block diagram of an exemplary system on a chip (SoC) 900 as can be used as the processing unit 802. A series of more powerful microprocessors 902, such as ARM® A72 or A53 cores, form the primary general-purpose processing block of the SoC 900, while a more powerful digital signal processor (DSP) 904 and multiple less powerful DSPs 905 provide specialized computing capabilities. A simpler processor 906, such as ARM R5F cores, provides general control capability in the SoC 900. The more powerful microprocessors 902, more powerful DSP 904, less powerful DSPs 905 and simpler processor 906 each include various data and instruction caches, such as L1I, L1D, and L2D, to improve speed of operations. A high-speed interconnect 908 connects the microprocessors 902, more powerful DSP 904, simpler DSPs 905 and processors 906 to various other components in the SoC 900. For example, a shared memory controller 910, which includes onboard memory or SRAM 912, is connected to the high-speed interconnect 908 to act as the onboard SRAM for the SoC 900. A DDR (double data rate) memory controller system 914 is connected to the high-speed interconnect 908 and acts as an external interface to external DRAM memory. The RAM 805 or 805 are formed by the SRAM 912 and external DRAM memory. A video acceleration module 916 and a radar processing accelerator (PAC) module 918 are similarly connected to the high-speed interconnect 908. A neural network acceleration module 917 is provided for hardware acceleration of neural network operations. A vision processing accelerator (VPACC) module 920 is connected to the high-speed interconnect 908, as is a depth and motion PAC (DMPAC) module 922.

A graphics acceleration module 924 is connected to the high-speed interconnect 908. A display subsystem 926 is connected to the high-speed interconnect 908 to allow operation with and connection to various video monitors. A system services block 932, which includes items such as DMA controllers, memory management units, general-purpose I/O's, mailboxes and the like, is provided for normal SoC 900 operation. A serial connectivity module 934 is connected to the high-speed interconnect 908 and includes modules as normal in an SoC. A vehicle connectivity module 936 provides interconnects for external communication interfaces, such as PCIe block 938, USB block 940 and an Ethernet switch 942. A capture/MIPI module 944 includes a four-lane CSI-2 compliant transmit block 946 and a four-lane CSI-2 receive module and hub.

An MCU island 960 is provided as a secondary subsystem and handles operation of the integrated SoC 900 when the other components are powered down to save energy. An MCU ARM processor 962, such as one or more ARM R5F cores, operates as a master and is coupled to the high-speed interconnect 908 through an isolation interface 961. An MCU general purpose I/O (GPIO) block 964 operates as a slave. MCU RAM 966 is provided to act as local memory for the MCU ARM processor 962. A CAN bus block 968, an additional external communication interface, is connected to allow operation with a conventional CAN bus environment in a vehicle. An Ethernet MAC (media access control) block 970 is provided for further connectivity. External memory, generally non-volatile memory (NVM) such as flash memory 804, is connected to the MCU ARM processor 962 via an external memory interface 969 to store instructions loaded into the various other memories for execution by the various appropriate processors. The MCU ARM processor 962 operates as a safety processor, monitoring operations of the SoC 900 to ensure proper operation of the SoC 900.

It is understood that this is one example of an SoC provided for explanation and many other SoC examples are possible, with varying numbers of processors, DSPs, accelerators and the like.

While this description has used a videoconferencing endpoint as the system employing the described color and exposure matching, the techniques can be applied in other systems having overlapping camera fields of view, such as cellular phones and the like.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for matching color and exposure of two overlapping cameras. The method also includes developing a first histogram of a frame of a first overlapping camera and a second histogram of a frame of a second overlapping camera. The method also includes determining peaks of the first histogram and the second histogram. The method also includes determining an assumed first and second histogram relationship. The method also includes determining an actual first and second histogram relationship. The method also includes categorizing the actual first and second histogram relationship to the assumed first and second histogram relationship into a category of a plurality of categories. The method also includes dependent on the category, analyzing the first and second histograms and develop needed changes to the two overlapping cameras. The method also includes providing the needed changes to allow correction of the first and second overlapping cameras. Other embodiments of this aspect include corresponding computer systems, apparatus, and computer programs recorded on one or more computer storage devices, each configured to perform the actions of the methods.

Implementations may include one or more of the following features. The method where one category of the plurality of categories is expected, and where the analysis of the first and second histograms includes: determining if unmatched peaks of the first histogram are to the left or right of the overall average of the second histogram to determine if the first overlapping camera is undersaturated or oversaturated; comparing the ratio of pixels in peaks above the overall average of the first histogram to the total number of pixels for the first histogram and the second histogram and the ratio of pixels in peaks below the overall average of the first histogram to the total number of pixels for the first histogram and the second histogram to determine if the first overlapping camera is undersaturated or oversaturated; determining if the two determinations if the first overlapping camera is undersaturated or oversaturated match; when the two determinations if the first overlapping camera is undersaturated or oversaturated match, comparing the differences in the ratios; when the difference in ratios is below a first amount, no changes are needed; when the difference in ratios is above the first amount but below a second amount, the needed change is to increase the undersaturated overlapping camera; and when the difference in ratios is above the second amount, the needed changes are to increase the undersaturated overlapping camera and decrease the oversaturated overlapping camera. Colon>when the two determinations if the first overlapping camera is undersaturated or oversaturated do not match, comparing the overall averages of the first and second histograms; when the overall averages are less than a third amount, no changes are needed; and when the overall averages are above the third amount, the needed changes are to increase the undersaturated overlapping camera and decrease the oversaturated overlapping camera. One category of the plurality of categories is rounded, and where the analysis of the first and second histograms further includes: for a pixel value between two peaks in the first histogram, determining if the same pixel value in the second histogram is above the dynamic threshold of the second histogram; and when the same pixel value in the second histogram is above the dynamic threshold of the second histogram, considering the two peaks of the first histogram to be a single peak. One category of the plurality of categories is matching, and where the analysis of the first and second histograms includes: determining the ratio of pixels in peaks to right and left of average pixel value for the first and second histograms; when the field of view of the first overlapping camera is a subset of or a perfect match to the field of view of the second overlapping camera: compare the ratios of the first and second histograms; when the ratios are equal, no change is needed; and when the ratios are not equal, the needed changes are to increase the lower ratio overlapping camera and decrease the higher ratio overlapping camera; and when the field of view of the first overlapping camera is a partial overlap of the field of view of the second overlapping camera: compare the ratios of the first and second histograms; when the ratios are equal, no change is needed; and when the ratios are not equal, the needed changes are to increase the lower ratio overlapping camera by an amount reduced based on the overlap of the two overlapping cameras and decrease the higher ratio overlapping camera by an amount reduced based on the overlap of the two overlapping cameras. One category of the plurality of categories is subsection, and where the analysis of the first and second histograms includes: determining the medians of the first and second histograms; comparing the medians of the first and second histograms; when the medians of the first and second histograms are substantially equal, no change is needed; and when the medians of the first and second histograms are not substantially equal, the needed changes are to increase the lower median overlapping camera by an amount reduced based on the overlap of the two overlapping cameras and the ratio of total pixels of the cropped view to the total pixels of the uncropped view and decrease the higher median overlapping camera by an amount reduced based on the overlap of the two overlapping cameras and the ratio of total pixels of the cropped view to the total pixels of the uncropped view. One category of the plurality of categories is safety, and where the analysis of the first and second histograms includes: for a pixel value between two peaks in the first histogram, determining if the same pixel value in the second histogram is above the dynamic threshold of the second histogram; when the same pixel value in the second histogram is above the dynamic threshold of the second histogram, considering the two peaks of the first histogram to be a single peak; determining matching and non-matching peaks between the first and second histograms; determining the ratios of pixels present in matching peaks to total pixels for the first and second histograms;

comparing the ratios of the first and second histograms; when the ratios of the first and second histograms are substantially equal, no change is needed; and when the ratios of the first and second histograms are not substantially equal, the needed changes are to increase the lower ratio overlapping camera by an amount reduced based on the overlap of the two overlapping cameras and decrease the higher ratio overlapping camera by an amount reduced based on the overlap of the two overlapping cameras. Determining peaks of the first histogram and the second histogram includes: determining the first and last histogram values and applying a factor; determining the averages for chunks of pixel values; determining the average of the averages and the factored first and last histogram values and setting that average as a dynamic threshold; removing the first and last histogram values and any consecutive pixel values exceeding the dynamic threshold where the consecutive value is less than a given number from peak analysis; performing peak analysis which includes: scanning the histogram array in order and determining if the pixel value exceeds the dynamic threshold, the consecutive pixel values exceeding the dynamic threshold forming a peak; and determining if the number of consecutive pixel values below the dynamic threshold and between two peaks is less than a small number and including those pixel values in the two peaks to form a single peak; and adding the first and last histogram values as peaks. The analysis of the first and second histograms includes: determining if a change in which overlapping camera is undersaturated and which overlapping camera is oversaturated has occurred in consecutive analyses; when a change in which overlapping camera is undersaturated and which overlapping camera is oversaturated has not occurred in consecutive analyses, no change to the needed changes is performed; when a change in which overlapping camera is undersaturated and which overlapping camera is oversaturated has occurred in consecutive analyses, determining if the current needed changes exceed a high threshold; when the current needed changes exceed the high threshold, no change to the needed changes is performed; and when the current needed changes do not exceed the high threshold, the needed change is reduced to no change. The steps are each performed separately for red, blue, green and perceived lightness. Implementations of the described techniques may include hardware, a method or process, or computer software on a computer-accessible medium.

The various examples described are provided byway of illustration and should not be construed to limit the scope of the disclosure. Various modifications and changes can be made to the principles and examples described herein without departing from the scope of the disclosure and without departing from the claims which follow.

The invention claimed is:

1. A method for matching color and exposure of two overlapping cameras, the method comprising:
   developing a first histogram of a frame of a first overlapping camera and a second histogram of a frame of a second overlapping camera;
   determining peaks of the first histogram and the second histogram;
   determining an assumed first and second histogram relationship;
   determining an actual first and second histogram relationship;
   categorizing the actual first and second histogram relationship to the assumed first and second histogram relationship into a category of a plurality of categories;
   dependent on the category, analyzing the first and second histograms and develop needed changes to the two overlapping cameras; and
   providing the needed changes to allow correction of the first and second overlapping cameras.

2. The method of claim 1, wherein one category of the plurality of categories is expected, and
   wherein the analysis of the first and second histograms includes:
      determining if unmatched peaks of the first histogram are to the left or right of the overall average of the second histogram to determine if the first overlapping camera is undersaturated or oversaturated;
      comparing the ratio of pixels in peaks above the overall average of the first histogram to the total number of pixels for the first histogram and the second histogram and the ratio of pixels in peaks below the overall average of the first histogram to the total number of pixels for the first histogram and the second histogram to determine if the first overlapping camera is undersaturated or oversaturated;
      determining if the two determinations if the first overlapping camera is undersaturated or oversaturated match;
      when the two determinations if the first overlapping camera is undersaturated or oversaturated match, comparing the differences in the ratios;
      when the difference in ratios is below a first amount, no changes are needed;
      when the difference in ratios is above the first amount but below a second amount, the needed change is to increase the undersaturated overlapping camera; and
      when the difference in ratios is above the second amount, the needed changes are to increase the undersaturated overlapping camera and decrease the oversaturated overlapping camera.

3. The method of claim 2, wherein:
   when the two determinations if the first overlapping camera is undersaturated or oversaturated do not match, comparing the overall averages of the first and second histograms;
   when the overall averages are less than a third amount, no changes are needed; and
   when the overall averages are above the third amount, the needed changes are to increase the undersaturated overlapping camera and decrease the oversaturated overlapping camera.

4. The method of claim 2, wherein one category of the plurality of categories is rounded, and
   wherein the analysis of the first and second histograms further includes:
      for a pixel value between two peaks in the first histogram, determining if the same pixel value in the second histogram is above the dynamic threshold of the second histogram; and
      when the same pixel value in the second histogram is above the dynamic threshold of the second histogram, considering the two peaks of the first histogram to be a single peak.

5. The method of claim 1, wherein one category of the plurality of categories is matching, and
   wherein the analysis of the first and second histograms includes:
      determining the ratio of pixels in peaks to right and left of average pixel value for the first and second histograms;

when the field of view of the first overlapping camera
is a subset of or a perfect match to the field of view
of the second overlapping camera:
compare the ratios of the first and second histograms;
when the ratios are equal, no change is needed; and
when the ratios are not equal, the needed changes are
to increase the lower ratio overlapping camera and
decrease the higher ratio overlapping camera; and
when the field of view of the first overlapping camera
is a partial overlap of the field of view of the second
overlapping camera:
compare the ratios of the first and second histograms;
when the ratios are equal, no change is needed; and
when the ratios are not equal, the needed changes are
to increase the lower ratio overlapping camera by
an amount reduced based on the overlap of the two
overlapping cameras and decrease the higher ratio
overlapping camera by an amount reduced based
on the overlap of the two overlapping cameras.

6. The method of claim 1, wherein one category of the plurality of categories is subsection, and
wherein the analysis of the first and second histograms includes:
determining the medians of the first and second histograms;
comparing the medians of the first and second histograms;
when the medians of the first and second histograms are substantially equal, no change is needed; and
when the medians of the first and second histograms are not substantially equal, the needed changes are to increase the lower median overlapping camera by an amount reduced based on the overlap of the two overlapping cameras and the ratio of total pixels of the cropped view to the total pixels of the uncropped view and decrease the higher median overlapping camera by an amount reduced based on the overlap of the two overlapping cameras and the ratio of total pixels of the cropped view to the total pixels of the uncropped view.

7. The method of claim 1, wherein one category of the plurality of categories is safety, and
wherein the analysis of the first and second histograms includes:
for a pixel value between two peaks in the first histogram, determining if the same pixel value in the second histogram is above the dynamic threshold of the second histogram;
when the same pixel value in the second histogram is above the dynamic threshold of the second histogram, considering the two peaks of the first histogram to be a single peak;
determining matching and non-matching peaks between the first and second histograms;
determining the ratios of pixels present in matching peaks to total pixels for the first and second histograms;
comparing the ratios of the first and second histograms;
when the ratios of the first and second histograms are substantially equal, no change is needed; and
when the ratios of the first and second histograms are not substantially equal, the needed changes are to increase the lower ratio overlapping camera by an amount reduced based on the overlap of the two overlapping cameras and decrease the higher ratio overlapping camera by an amount reduced based on the overlap of the two overlapping cameras.

8. The method of claim 1, wherein determining peaks of the first histogram and the second histogram includes:
determining the first and last histogram values and applying a factor;
determining the averages for chunks of pixel values;
determining the average of the averages and the factored first and last histogram values and setting that average as a dynamic threshold;
removing the first and last histogram values and any consecutive pixel values exceeding the dynamic threshold where the consecutive value is less than a given number from peak analysis;
performing peak analysis which includes:
scanning the histogram array in order and determining if the pixel value exceeds the dynamic threshold, the consecutive pixel values exceeding the dynamic threshold forming a peak; and
determining if the number of consecutive pixel values below the dynamic threshold and between two peaks is less than a small number and including those pixel values in the two peaks to form a single peak; and
adding the first and last histogram values as peaks.

9. The method of claim 1, wherein the analysis of the first and second histograms includes:
determining if a change in which overlapping camera is undersaturated and which overlapping camera is oversaturated has occurred in consecutive analyses;
when a change in which overlapping camera is undersaturated and which overlapping camera is oversaturated has not occurred in consecutive analyses, no change to the needed changes is performed;
when a change in which overlapping camera is undersaturated and which overlapping camera is oversaturated has occurred in consecutive analyses, determining if the current needed changes exceed a high threshold;
when the current needed changes exceed the high threshold, no change to the needed changes is performed; and
when the current needed changes do not exceed the high threshold, the needed change is reduced to no change.

10. The method of claim 1, wherein the steps of claim 1 are each performed separately for red, blue, green and perceived lightness.

11. A non-transitory processor readable memory containing instructions that when executed cause a processor or processors to perform the following method for matching color and exposure of two overlapping cameras, the method comprising:
developing a first histogram of a frame of a first overlapping camera and a second histogram of a frame of a second overlapping camera;
determining peaks of the first histogram and the second histogram;
determining an assumed first and second histogram relationship;
determining an actual first and second histogram relationship;
categorizing the actual first and second histogram relationship to the assumed first and second histogram relationship into a category of a plurality of categories;
dependent on the category, analyzing the first and second histograms and develop needed changes to the two overlapping cameras; and
providing the needed changes to allow correction of the first and second overlapping cameras.

12. The non-transitory processor readable memory of claim 11, wherein one category of the plurality of categories is expected, and wherein the analysis of the first and second histograms includes:
  determining if unmatched peaks of the first histogram are to the left or right of the overall average of the second histogram to determine if the first overlapping camera is undersaturated or oversaturated;
  comparing the ratio of pixels in peaks above the overall average of the first histogram to the total number of pixels for the first histogram and the second histogram and the ratio of pixels in peaks below the overall average of the first histogram to the total number of pixels for the first histogram and the second histogram to determine if the first overlapping camera is undersaturated or oversaturated;
  determining if the two determinations if the first overlapping camera is undersaturated or oversaturated match;
  when the two determinations if the first overlapping camera is undersaturated or oversaturated match, comparing the differences in the ratios;
  when the difference in ratios is below a first amount, no changes are needed;
  when the difference in ratios is above the first amount but below a second amount, the needed change is to increase the undersaturated overlapping camera; and
  when the difference in ratios is above the second amount, the needed changes are to increase the undersaturated overlapping camera and decrease the oversaturated overlapping camera.

13. The non-transitory processor readable memory of claim 12, wherein the analysis of the first and second histograms further includes:
  when the two determinations if the first overlapping camera is undersaturated or oversaturated do not match, comparing the overall averages of the first and second histograms;
  when the overall averages are less than a third amount, no changes are needed; and
  when the overall averages are above the third amount, the needed changes are to increase the undersaturated overlapping camera and decrease the oversaturated overlapping camera.

14. The non-transitory processor readable memory of claim 12, wherein one category of the plurality of categories is rounded, and
  wherein the analysis of the first and second histograms further includes:
    for a pixel value between two peaks in the first histogram, determining if the same pixel value in the second histogram is above the dynamic threshold of the second histogram; and
    when the same pixel value in the second histogram is above the dynamic threshold of the second histogram, considering the two peaks of the first histogram to be a single peak.

15. The non-transitory processor readable memory of claim 11, wherein one category of the plurality of categories is matching, and
  wherein the analysis of the first and second histograms includes:
    determining the ratio of pixels in peaks to right and left of average pixel value for the first and second histograms;
    when the field of view of the first overlapping camera is a subset of or a perfect match to the field of view of the second overlapping camera:
      compare the ratios of the first and second histograms;
      when the ratios are equal, no change is needed; and
      when the ratios are not equal, the needed changes are to increase the lower ratio overlapping camera and decrease the higher ratio overlapping camera; and
    when the field of view of the first overlapping camera is a partial overlap of the field of view of the second overlapping camera:
      compare the ratios of the first and second histograms;
      when the ratios are equal, no change is needed; and
      when the ratios are not equal, the needed changes are to increase the lower ratio overlapping camera by an amount reduced based on the overlap of the two overlapping cameras and decrease the higher ratio overlapping camera by an amount reduced based on the overlap of the two overlapping cameras.

16. The non-transitory processor readable memory of claim 11, wherein one category of the plurality of categories is subsection, and
  wherein the analysis of the first and second histograms includes:
    determining the medians of the first and second histograms;
    comparing the medians of the first and second histograms;
    when the medians of the first and second histograms are substantially equal, no change is needed; and
    when the medians of the first and second histograms are not substantially equal, the needed changes are to increase the lower median overlapping camera by an amount reduced based on the overlap of the two overlapping cameras and the ratio of total pixels of the cropped view to the total pixels of the uncropped view and decrease the higher median overlapping camera by an amount reduced based on the overlap of the two overlapping cameras and the ratio of total pixels of the cropped view to the total pixels of the uncropped view.

17. The non-transitory processor readable memory of claim 11, wherein one category of the plurality of categories is safety, and
  wherein the analysis of the first and second histograms includes:
    for a pixel value between two peaks in the first histogram, determining if the same pixel value in the second histogram is above the dynamic threshold of the second histogram;
    when the same pixel value in the second histogram is above the dynamic threshold of the second histogram, considering the two peaks of the first histogram to be a single peak;
    determining matching and non-matching peaks between the first and second histograms;
    determining the ratios of pixels present in matching peaks to total pixels for the first and second histograms;
    comparing the ratios of the first and second histograms;
    when the ratios of the first and second histograms are substantially equal, no change is needed; and
    when the ratios of the first and second histograms are not substantially equal, the needed changes are to increase the lower ratio overlapping camera by an amount reduced based on the overlap of the two overlapping cameras and decrease the higher ratio overlapping camera by an amount reduced based on the overlap of the two overlapping cameras.

18. The non-transitory processor readable memory of claim 11, wherein determining peaks of the first histogram and the second histogram includes:
- determining the first and last histogram values and applying a factor;
- determining the averages for chunks of pixel values;
- determining the average of the averages and the factored first and last histogram values and setting that average as a dynamic threshold;
- removing the first and last histogram values and any consecutive pixel values exceeding the dynamic threshold where the consecutive value is less than a given number from peak analysis;
- performing peak analysis which includes:
  - scanning the histogram array in order and determining if the pixel value exceeds the dynamic threshold, the consecutive pixel values exceeding the dynamic threshold forming a peak; and
  - determining if the number of consecutive pixel values below the dynamic threshold and between two peaks is less than a small number and including those pixel values in the two peaks to form a single peak; and
- adding the first and last histogram values as peaks.

19. The non-transitory processor readable memory of claim 11, wherein the analysis of the first and second histograms includes:
- determining if a change in which overlapping camera is undersaturated and which overlapping camera is oversaturated has occurred in consecutive analyses;
- when a change in which overlapping camera is undersaturated and which overlapping camera is oversaturated has not occurred in consecutive analyses, no change to the needed changes is performed;
- when a change in which overlapping camera is undersaturated and which overlapping camera is oversaturated has occurred in consecutive analyses, determining if the current needed change exceeds a high threshold;
- when the current needed change exceeds the high threshold, no change to the needed changes is performed; and
- when the current needed change does not exceed the high threshold, the needed change is reduced to no change.

20. The non-transitory processor readable memory of claim 11, wherein the steps of claim 11 are each performed separately for red, blue, green and perceived lightness.

\* \* \* \* \*